(12) United States Patent
Tokuchi

(10) Patent No.: US 11,099,710 B2
(45) Date of Patent: Aug. 24, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/120,781

(22) Filed: Sep. 4, 2018

(65) Prior Publication Data

US 2019/0272806 A1 Sep. 5, 2019

(30) Foreign Application Priority Data

Mar. 1, 2018 (JP) .............................. JP2018-036656

(51) Int. Cl.
*G06F 3/0481* (2013.01)
*G06F 3/0484* (2013.01)
*G06F 3/042* (2006.01)
*G09G 5/36* (2006.01)

(52) U.S. Cl.
CPC ......... *G06F 3/04817* (2013.01); *G09G 5/363* (2013.01); *G09G 2340/0464* (2013.01); *G09G 2354/00* (2013.01)

(58) Field of Classification Search
CPC . G06F 3/1288; G06F 3/1292; H04N 1/00307; H04N 2201/0094
See application file for complete search history.

(56) References Cited

U.S. PATENT DOCUMENTS

| 6,009,466 A * | 12/1999 | Axberg ..................... G06F 8/34 709/220 |
| 9,075,514 B1 * | 7/2015 | Karakotsios .......... G06F 3/0488 |
| 9,137,393 B2 | 9/2015 | Sato |
| 9,639,255 B2 * | 5/2017 | Patil ..................... G06F 3/04847 |
| 9,671,869 B2 * | 6/2017 | Katz ....................... G06F 3/017 |
| 2003/0130821 A1 * | 7/2003 | Anslow .................. H04L 41/12 702/186 |
| 2010/0211951 A1 | 8/2010 | Ito |
| 2011/0196864 A1 * | 8/2011 | Mason .................. G06F 3/0416 707/728 |
| 2014/0040259 A1 * | 2/2014 | Takematsu ........... G06F 16/284 707/736 |
| 2015/0033163 A1 * | 1/2015 | Hinkel .................. G06F 3/0484 715/765 |
| 2015/0070725 A1 * | 3/2015 | Monden ................ G06F 3/1232 358/1.15 |
| 2016/0330082 A1 * | 11/2016 | Bliss .................... H04L 41/0873 |
| 2016/0378251 A1 * | 12/2016 | Aznoe ................. G06F 3/04812 345/158 |
| 2017/0346982 A1 * | 11/2017 | Yamada ............. H04N 1/32539 |

FOREIGN PATENT DOCUMENTS

| JP | 2010-187199 A | 8/2010 |
| JP | 2011-166748 A | 8/2011 |

* cited by examiner

*Primary Examiner* — Jordany Nunez
(74) *Attorney, Agent, or Firm* — Oliff PLC

(57) ABSTRACT

An information processing apparatus includes a controller that changes, upon selection of first information associated with a first element, a display state of second information associated with a second element defined as an element that executes a function in cooperation with the first element.

15 Claims, 12 Drawing Sheets

FIG. 4

< COOPERATIVE FUNCTION MANAGEMENT TABLE >

| ID | COOPERATIVE FUNCTION | NECESSARY ELEMENTS | COMPATIBILITY LEVEL | PRIORITY | IMAGE PROCESSING |
|---|---|---|---|---|---|
| 1 | SCAN TRANSFER FUNCTION | MULTIFUNCTION PRINTER A, PC(B1) | 1 | 1 | TRANSPARENCY LEVEL 1 |
| 2 | PRINT FUNCTION | MULTIFUNCTION PRINTER A, PC(B2) | 2 | 2 | TRANSPARENCY LEVEL 2 |
| 3 | PROJECTING FUNCTION | PROJECTOR C, PC(B1) | 2 | 2 | TRANSPARENCY LEVEL 2 |
| 4 | LIGHTING FUNCTION | DOOR OPENING/CLOSING SENSOR D, LIGHTING DEVICE E | 3 | 3 | TRANSPARENCY LEVEL 3 |
| 5 | PASSWORD FUNCTION | DOCUMENT CREATION SOFTWARE F, PASSWORD SETTING SOFTWARE G | 1 | 1 | TRANSPARENCY LEVEL 1 |
| 6 | DOCUMENT TRANSMISSION FUNCTION | DOCUMENT CREATION SOFTWARE F, DATA TRANSMISSION SOFTWARE H | 2 | 2 | TRANSPARENCY LEVEL 2 |
| 7 | FILE ADDING FUNCTION | DOCUMENT FILE J, ACCOUNTING FILE K | 3 | 3 | TRANSPARENCY LEVEL 3 |
| 8 | CHARACTER RECOGNIZING FUNCTION | MULTIFUNCTION PRINTER A, CHARACTER RECOGNIZING SOFTWARE L | 2 | 2 | TRANSPARENCY LEVEL 2 |
| 9 | PRINT FUNCTION | MULTIFUNCTION PRINTER A, DOCUMENT FILE J | 1 | 1 | TRANSPARENCY LEVEL 1 |
| 10 | CHARACTER EXTRACTION FUNCTION | CHARACTER RECOGNIZING SOFTWARE L, IMAGE FILE M | 2 | 2 | TRANSPARENCY LEVEL 2 |
| 11 | FILE ADDING FUNCTION | SCANNER N, CHARACTER RECOGNIZING SOFTWARE L, FORM CREATION SOFTWARE P, RECEIPT, ACCOUNTING FILE Q | 3 | 3 | TRANSPARENCY LEVEL 3 |
| 12 | SHOPPING FUNCTION | WEB BROWSER R, SHOPPING SITE S, CLOTHING T | 2 | 2 | TRANSPARENCY LEVEL 2 |
| ... | ... | ... | ... | ... | ... |

FIG. 11

< COOPERATIVE FUNCTION MANAGEMENT TABLE >

| ID | COOPERATIVE FUNCTION | NECESSARY ELEMENTS | COMPATIBILITY LEVEL | PRIORITY | IMAGE PROCESSING |
|---|---|---|---|---|---|
| 1 | SCAN TRANSFER FUNCTION | MULTIFUNCTION PRINTER A, PC(B1) | 1 | 1 | DISTANCE LEVEL 1 |
| 2 | PRINT FUNCTION | MULTIFUNCTION PRINTER A, PC(B2) | 2 | 2 | DISTANCE LEVEL 2 |
| 3 | PROJECTING FUNCTION | PROJECTOR C, PC(B1) | 2 | 2 | DISTANCE LEVEL 2 |
| 4 | LIGHTING FUNCTION | DOOR OPENING/CLOSING SENSOR D, LIGHTING DEVICE E | 3 | 3 | DISTANCE LEVEL 3 |
| 5 | PASSWORD FUNCTION | DOCUMENT CREATION SOFTWARE F, PASSWORD SETTING SOFTWARE G | 1 | 1 | DISTANCE LEVEL 1 |
| 6 | DOCUMENT TRANSMISSION FUNCTION | DOCUMENT CREATION SOFTWARE F, DATA TRANSMISSION SOFTWARE H | 2 | 2 | DISTANCE LEVEL 2 |
| 7 | FILE ADDING FUNCTION | DOCUMENT FILE J, ACCOUNTING FILE K | 3 | 3 | DISTANCE LEVEL 3 |
| 8 | CHARACTER RECOGNIZING FUNCTION | MULTIFUNCTION PRINTER A, CHARACTER RECOGNIZING SOFTWARE L | 2 | 2 | DISTANCE LEVEL 2 |
| 9 | PRINT FUNCTION | MULTIFUNCTION PRINTER A, DOCUMENT FILE J | 1 | 1 | DISTANCE LEVEL 1 |
| 10 | CHARACTER EXTRACTION FUNCTION | CHARACTER RECOGNIZING SOFTWARE L, IMAGE FILE M | 2 | 2 | DISTANCE LEVEL 2 |
| 11 | FILE ADDING FUNCTION | SCANNER N, CHARACTER RECOGNIZING SOFTWARE L, FORM CREATION SOFTWARE P, RECEIPT, ACCOUNTING FILE Q | 3 | 3 | DISTANCE LEVEL 3 |
| 12 | SHOPPING FUNCTION | WEB BROWSER R, SHOPPING SITE S, CLOTHING T | 2 | 2 | DISTANCE LEVEL 2 |
| ... | ... | ... | ... | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-036656 filed Mar. 1, 2018.

BACKGROUND

Technical Field

The present invention relates to an information processing apparatus and a non-transitory computer readable medium.

SUMMARY

According to an aspect of the invention, there is provided an information processing apparatus including a controller that changes, upon selection of first information associated with a first element, a display state of second information associated with a second element defined as an element that executes a function in cooperation with the first element.

BRIEF DESCRIPTION OF THE DRAWINGS

Exemplary embodiments of the present invention will be described in detail based on the following figures, wherein:

FIG. 4 illustrates a cooperative function management table according to the first exemplary embodiment;

FIG. 11 illustrates a cooperative function management table according to the second exemplary embodiment.

DETAILED DESCRIPTION

First Exemplary Embodiment

Figure 1:
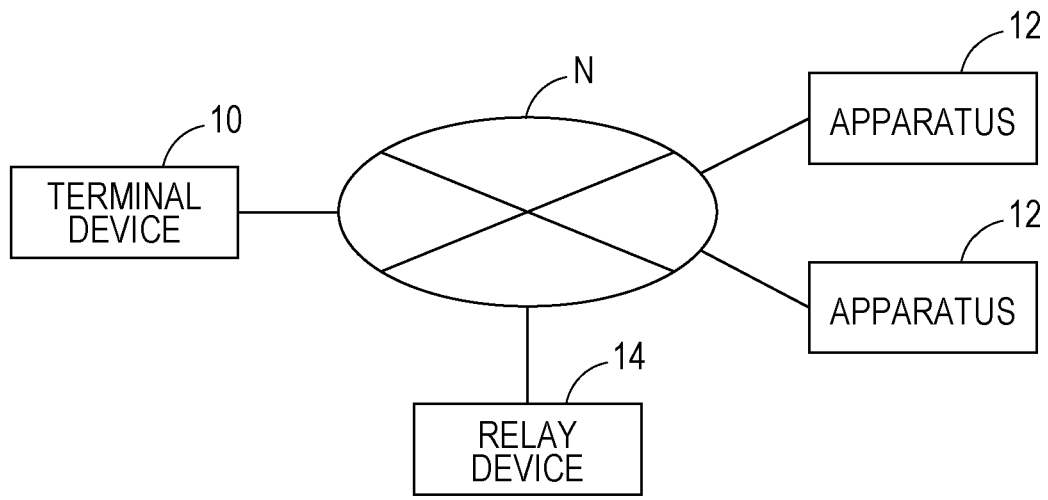
FIG. 1 is a block diagram illustrating a configuration of an information processing system according to a first exemplary embodiment of the present invention.

An information processing system according to a first exemplary embodiment of the present invention is described with reference to FIG. 1. FIG. 1 illustrates an example of the information processing system according to the first exemplary embodiment.

The information processing system according to the first exemplary embodiment includes, for example, one or more terminal devices 10, one or more apparatuses 12, and one or more relay devices 14. In the example illustrated in FIG. 1, the information processing system includes a single terminal device 10, two apparatuses 12, and a single relay device 14. These numbers are merely an example, and the information processing system may include a terminal device(s), an apparatus(es), and a relay device(s) in numbers different from these numbers. The terminal device 10, the apparatuses 12, and the relay device 14 have, for example, a function of communicating with one another over a communication path N such as a network. The communication may be wireless communication or wired communication. The Internet may be used as the communication path N. The terminal device 10, the apparatuses 12, and the relay device 14 may communicate with another device over different communication paths, respectively without using the communication path N or may directly communicate with another device. The relay device 14 may function as a hub for connecting plural devices to one another, and the terminal device 10 and the apparatus 12 may communicate with each other through the relay device 14 by being connected to the relay device 14. A device such as a server may be included in the information processing system.

In a case where the relay device 14 is not used, the relay device 14 need not be included in the information processing system. Similarly, in a case where the apparatus 12 is not used, the apparatus 12 need not be included in the information processing system. A cooperative function is executed by using software, the apparatus 12, and the like as described later. In a case where the apparatus 12 is not used for the cooperative function, the apparatus 12 need not be included in the information processing system. The cooperative function will be described later in detail.

The terminal device 10 is a device such as a personal computer (PC), a tablet PC, a smartphone, or a mobile phone and has a function of communicating with another device. The terminal device 10 may be a wearable terminal (a wristwatch-type terminal, a wristband-type terminal, an eyeglass-type terminal, a ring-type terminal, a contact-lens-type terminal, a self-contained-type terminal, or a bearable terminal). The terminal device 10 may have a flexible display as a display device. The flexible display is, for example, an organic electroluminescence display (flexible organic EL display), an electronic paper display, or a flexible liquid crystal display. A flexible display employing a display method other than these display methods may be used. The flexible display is a display having a display part that can be flexibly deformed and is a display that can be, for example, bent, folded, wound, twisted, and stretched. The whole terminal device 10 may be constituted by a flexible display or may be configured such that a flexible display and other constituent elements are functionally and physically divided.

The apparatus 12 is an apparatus that has a function and is, for example, an apparatus such as an image forming apparatus having an image forming function (e.g., a scan function, a print function, a copy function, or a facsimile function), a PC, a tablet PC, a smartphone, a mobile phone, a robot (e.g., a humanoid robot, an animal-type robot, or a robot of other types), a projector, a display device such as a liquid crystal display, a recording device, a reproduction device, an imaging device such as a camera, a refrigerator, a rice cooker, an microwave oven, a coffee maker, a vacuum cleaner, a washing machine, an air conditioner, a lighting device, a clock, a surveillance camera, an automobile, a motorcycle, an aircraft (e.g., an uninhabited aircraft (a drone)), a gaming machine, or a sensing apparatus of various kinds (e.g., a temperature sensor, a humidity sensor, a voltage sensor, or a current sensor). The apparatus 12 may be an apparatus (e.g., an image forming apparatus or a PC) that outputs information to a user or may be an apparatus (e.g., a sensing apparatus) that does not output information to a user. All of plural apparatuses that execute the cooperative function that will be described later may be apparatuses that output information to a user. Alternatively, one or some of the plural apparatuses that execute the cooperative function that will be described later may be an apparatus(es) that output information to a user, and other apparatus(es) may be an apparatus(es) that does not output information to a user. Alternatively, all of plural apparatuses that execute the cooperative function that will be described later may be apparatuses that do not output information to a user. The concept of the apparatus 12 may encompasses apparatuses in general. For example, an information apparatus, a video apparatus, an audio apparatus, and other kinds of apparatuses may be encompassed within the scope of an apparatus according to the first exemplary embodiment. The apparatus 12 has a function of communicating with another device.

The relay device 14 is a device that controls operation of each apparatus 12. Furthermore, the relay device 14 has a function of communicating with another device. The relay device 14 may acquire various kinds of information, for example, by using the Internet. The relay device 14 may function as a server or may, for example, manage data and user information. The relay device 14 may be a smart speaker (an apparatus that has a wireless communication function and a speaker function) or may be an apparatus that has a communication function but does not have a speaker function. The relay device 14 may be installed indoor (e.g., on a floor of a room, a ceiling, or a table) or may be installed outdoor. The relay device 14 may be a movable apparatus (e.g., a self-propelled apparatus). The apparatus 12 itself may function as the relay device 14.

The terminal device 10 may control operation of the apparatus 12 by communicating with the apparatus 12 directly or through another apparatus or a communication path without using the relay device 14.

For example, the terminal device 10 is an example of an information processing apparatus. The apparatus 12 or the relay device 14 may be an example of an information processing apparatus.

Figure 2:
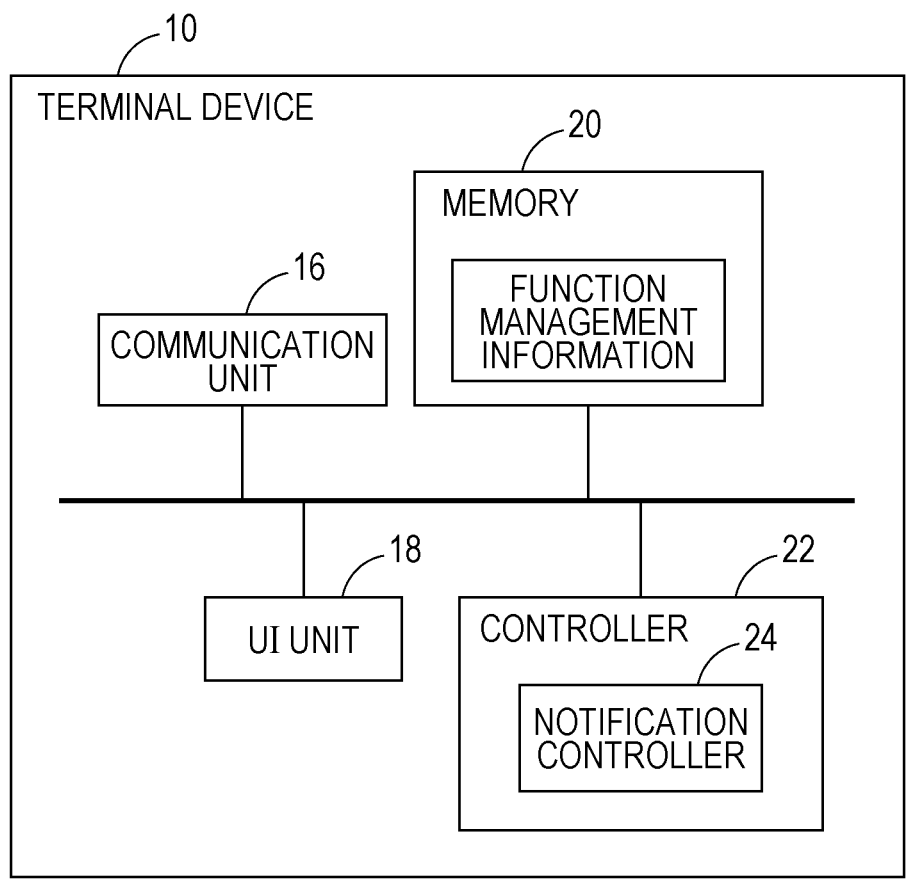
FIG. 2 is a block diagram illustrating a configuration of a terminal device.

A configuration of the terminal device 10 is described in detail below with reference to FIG. 2.

A communication unit 16 is a communication interface and has a function of transmitting data to another device and a function of receiving data from another device. The communication unit 16 may be a communication interface that has a wireless communication function or may be a communication interface that has a wired communication function. For example, the communication unit 16 may support one or more kinds of communication methods and communicate with a communication partner in accordance with a communication method suitable for the communication partner (i.e., a communication method supported by the communication partner). The communication method may be, for example, infrared communication, visible light communication, Wi-Fi (Registered trademark) communication, or close-range wireless communication (e.g., near field communication (NFC)). The close-range wireless communication is, for example, Felica (Registered Trademark), Bluetooth (Registered Trademark), or a radio frequency identifier (RFID). Another wireless communication method may be used as the close-range wireless communication. The communication unit 16 may switch a communication method and a frequency band in accordance with a communication partner or may switch a communication method and a frequency band in accordance with a surrounding environment.

A UI unit 18 is a user interface unit and includes a display and an operation unit. The display is, for example, a display device such as a liquid crystal display. The display may be a flexible display. The operation unit is, for example, an input device such as a touch panel or a keyboard. The UI unit 18 may be a user interface that functions as both a display and an operation unit (including, for example, a touch-type display, a device electronically displaying a keyboard and the like on the display, and the like). The UI unit 18 may include a sound collecting unit such as a microphone and a sound generating unit such as a speaker. In this case, audio information may be input to the terminal device 10, and audio information may be emitted by the terminal device 10.

A memory 20 is a storage device such as a hard disk or a memory (e.g., an SSD). The memory 20 stores therein, for example, function management information, various kinds of data, various kinds of programs (e.g., an operating system (OS), various kinds of application programs (e.g., application software)), information indicative of addresses of the apparatuses 12 (apparatus address information), and information indicative of an address of the relay device 14 (relay device address information). The data, information, and programs may be stored in different storage devices or may be stored in a single storage device.

The function management information is described below. The function management information is information for managing a cooperative function that is executable with the use of elements (e.g., an apparatus that serves as hardware, software, or a target). For example, the function management information is prepared in advance and stored in the memory 20. The target that serves as an element is, for example, a file (data) or a physical object to which the cooperative function is applied. The cooperative function is a function that is executable with the use of plural elements. For example, the cooperative function is a function that is executable through cooperation of plural elements. The cooperative function may be a function that is executable with the use of plural functions of a single apparatus or single software.

The terminal device 10 and the relay device 14 may be used as apparatuses that execute the cooperative function, and functions of the terminal device 10 and the relay device 14 may be used for the cooperative function. Software and a file used for the cooperative function may be stored in the memory 20 of the terminal device 10 or may be stored in the apparatus 12, the relay device 14, and another device (e.g., a server).

A whole apparatus, a specific part of an apparatus, a specific function of software, an assembled function including plural functions, or the like may be used as an element. For example, in a case where a function is allocated to each part of an apparatus, the cooperative function may be a function using the part. In a case where software has plural functions, the cooperative function may be a function of using one or some of the plural functions. The assembled function is constituted by plural functions, and processing using the assembled function is executed by executing plural functions concurrently or sequentially. The cooperative function may be a function using only hardware, may be a function using only software, or may be a function using both hardware and software.

The function management information is, for example, information indicative of correspondence between function information concerning a cooperative function and plural elements (element identification information for identifying the elements) used for the cooperative function. For example, function information concerning a cooperative function and a combination of plural elements (a combination of pieces of element identification information for identifying the elements) used for the cooperative function are registered in association with each other in the function management information. For example, function information concerning a cooperative function and plural apparatuses used for the cooperative function are associated with each other. In a case where plural parts included in an apparatus are used for a cooperative function, function information concerning the cooperative function and the plural parts are associated with each other. The parts may be included in a single apparatus or may be included in different apparatuses. The same applies to software and a target.

In a case where an element is an apparatus, element identification information is information (apparatus identification information) for identifying the apparatus. In a case where an element is software, element identification information is information (software identification information) for identifying the software. In a case where an element is a target, element identification information is information (target identification information) for identifying the target. The element identification information for identifying an apparatus may include information indicative of a function of the apparatus. Similarly, the element identification information for identifying software may include information indicative of a function of the software.

The apparatus identification information is, for example, a name of an apparatus, an apparatus ID, information indicative of a kind of apparatus, a model number of an apparatus, information for managing an apparatus (e.g., asset management information), information (positional information of an apparatus) indicative of a position where an apparatus is installed, an image (apparatus image) associated with an apparatus, or apparatus address information. The apparatus image is, for example, an external appearance image representative of an apparatus. The external appearance image may be an image showing an outer side of an apparatus (e.g., a housing of the apparatus), may be an image showing a state (e.g., an internal structure) in which an inner side can be seen from an outside through an opening in the housing, or may be an image showing a state where the apparatus is covered with a sheet for packaging. The apparatus image may be an image (e.g., an image showing external appearance of the apparatus or an image showing an inside of the apparatus) generated by photographing the apparatus by using an imaging device such as a camera or may be an image (e.g., an icon) schematically showing the apparatus. The apparatus image may be a still image or may be a moving image. Data of the apparatus image may be stored in the memory 20 or may be stored in another device (e.g., the apparatus 12, the relay device 14, or a server).

The software identification information is, for example, a name of software, a software ID, information indicative of a kind of software, a model number of software, information for managing software, or an image (software image) associated with software. The software image is, for example, an image (e.g., an icon) representative of software. The software image may be a still image or a moving image. Data of a software image may be stored in the memory 20 or may be stored in another device (e.g., the apparatus 12, the relay device 14, or a server).

The target identification information is, for example, a name of a target, a target ID, information indicative of a kind of target, or an image (target image) associated with a target. For example, in a case where a target is a file (data), a name of the file (e.g., an image file or a document file) for example is used as the target identification information. In a case where the target is a physical object (e.g., a commercial product), a name of the object for example is used as target identification information. The target image may be an image (a still image or a moving image) generated by photographing a physical target by using a photographing device such as a camera or may be an image (e.g., an icon) schematically representing the target. Data of a target image may be stored in the memory 20 or may be stored in another device (e.g., the apparatus 12, the relay device 14, or a server).

The function information includes, for example, identification information such as a name and an ID of a cooperative function. The function information may include content information indicative of contents of a function.

The cooperative function may be a function that is executable through cooperation of different plural elements or may be a function that is executable through cooperation of elements that are identical to each other. The cooperative function may be a function that is unavailable before cooperation. For example, a copying function as a cooperative function becomes executable as a result of cooperation of an apparatus (a printer) that has a print function and an apparatus (a scanner) that has a scan function. That is, the copy function becomes executable through cooperation of a print function and a scan function. In this case, the copy function that is a cooperative function and a combination of the print function and the scan function are associated.

The concept of the cooperative function may encompass a united function that newly becomes executable through cooperation of plural apparatuses or plural pieces of software. For example, an expanded display function as a united function may be realized by combining plural displays. In another example, a recording function as a united function may be realized by combining a television set and a recorder. The recording function may be a function of recording an image displayed on the television set. Furthermore, a photographing region expanding function as a united function may be realized by combining plural cameras. This expanding function is, for example, a function of obtaining an image by joining photographing regions of cameras. Furthermore, a telephone conversation translation function (a function of translating a telephone conversation) as a united function may be realized by combining a telephone, a translation machine, and translation software. As described above, the concept of the cooperative function may encompass a function that becomes executable through cooperation of plural apparatuses of an identical kind or plural pieces of software of an identical kind and a function that becomes executable through cooperation of plural apparatuses of different kinds or plural pieces of software of different kinds.

The function management information may be stored in a device (e.g., the apparatus 12, the relay device 14, or a server) other than the terminal device 10. In this case, the function management information need not be stored in the terminal device 10.

A controller 22 is configured to control operation of each unit of the terminal device 10. For example, the controller 22 executes various kinds of programs, controls communication using the communication unit 16, controls notification of information (e.g., display or audio output of information) using the UI unit 18, and receives information input to the terminal device 10 by using the UI unit 18. The controller 22 includes a notification controller 24.

The notification controller 24 is configured to present, upon user's selection of first information associated with a first element, second information associated with a second element that is defined as an element that executes a cooperative function in cooperation with the first element and second information associated with a second element that is not defined as an element that executes a cooperative function in cooperation with the first element in a distinguishable manner. The first element and the second element each are an apparatus, software, or a target described above. For example, the first information may be an image (an apparatus image, a software image, or a target image) representative of the first element, may be audio information indicative of the first element, or may be text information indicative of the first element. For example, the second information may be an image representative of the second element, may be audio information indicative of the second element, or may be text information indicative of the second element. The presentation is, for example, display of an image, display of a character string, or output of sound.

More specifically, in the function management information, the notification controller 24 specifies a second element that is defined (registered) as an element that executes a cooperative function in cooperation with a first element selected by a user, and further specifies a second element that is not defined (not registered) as an element that executes a cooperative function in cooperation with the first element. The notification controller 24 presents pieces of second information that are associated with these second elements in a distinguishable manner.

Hereinafter, the second element that is defined as an element that executes a cooperative function in cooperation with a first element is referred to as a "compliant element", and the second element that is not defined as an element that executes a cooperative function in cooperation with a first element is referred to as a "non-compliant element".

In the first exemplary embodiment, in a case where first information associated with a first element is selected by a user, the notification controller 24 changes second information associated with a non-compliant element. For example, in a case where images associated with elements are displayed on the display of the UI unit 18 and a first image associated with the first element is selected from among the images by the user, the notification controller 24 changes a second image associated with a second element that is a non-compliant element in relation to the first element. The notification controller 24 may delete the image associated with the non-compliant element from the display, may display the image on the display in a gray-out state, may display the image on the display in a semi-transparent state, may display the image on the display in a vibrating state, may display the image on the display in a different size (e.g., in a reduced size), or may display the image on the display in a blinking manner.

In another example, the notification controller 24 may change second information in accordance with compatibility between a first element and a second element. The compatibility between a first element and a second element is compatibility concerning execution of a cooperative function and is decided in advance, for example, on the basis of the number of cooperative functions that are executable with the use of the first element and the second element, a relationship between performance of the first element and performance of the second element, and a relationship between a manufacturer of the first element and a manufacturer of the second element. The second element may be a compliant element or may be a non-compliant element. For example, the notification controller 24 may cause a second image associated with a second element that has poorer compatibility with the first element to be displayed on the display in higher transparency or in a smaller size. The notification controller 24 may change second information associated with a second element that has compatibility poorer than reference compatibility (a threshold value).

The notification controller 24 may be provided in a device (e.g., the apparatus 12, the relay device 14, or a server) other than the terminal device 10, and processing using the notification controller 24 may be performed by the device other than the terminal device 10.

The information processing system according to the first exemplary embodiment is described in detail below by using a specific example.

Figure 3:
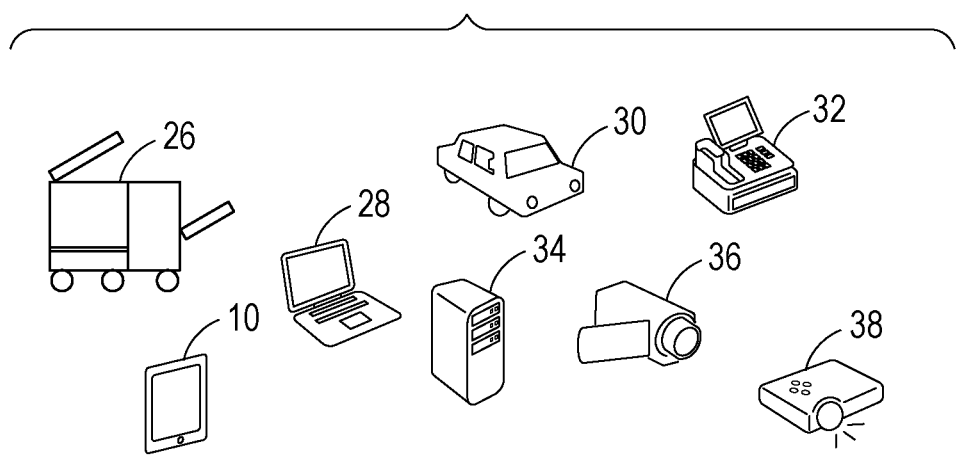
FIG. 3 illustrates examples of an apparatus.

An example of the apparatus 12 is described with reference to FIG. 3. FIG. 3 illustrates examples of the apparatus 12. For example, a multifunction printer 26 that has an image formation function such as a copy function, a print function, or a scan function, a notebook PC 28, an automobile 30, a cash register 32, a desktop PC 34, a video camera 36, and a projector 38 are used as the apparatuses 12. Needless to say, an apparatus other than these apparatuses may be used as the apparatus 12.

The function management information according to the first exemplary embodiment is described in detail with reference to FIG. 4. FIG. 4 illustrates an example of a cooperative function management table as the function management information according to the first exemplary embodiment.

In the cooperative function management table according to the first exemplary embodiment, an ID that is identification information of a cooperative function, information indicative of a name that is identification information of the cooperative function, information indicative of elements (an apparatus, software, or a target) used for the cooperative function, information indicative of a compatibility level, information indicative of a priority, and information indicative of image processing are associated with one another for example.

A whole apparatus or a part of an apparatus may be used as an element. Furthermore, a specific function of software may be used as an element.

An element is specified by a subordinate-concept-level information (e.g., a name unique to the element (e.g., a specific product name, a trade name, a model number, a web site name, or a URL)). Needless to say, an element may be specified by superordinate-concept-level information (e.g., a generic name or a general name of the element).

The compatibility level is information indicative of compatibility between plural elements used for a cooperative function. For example, a value in a range from 1 to 3 is given in advance as a compatibility level in accordance with compatibility between plural elements used for a cooperative function. A compatibility level "1" indicates that compatibility is good, a compatibility level "2" indicates that compatibility is average, and a compatibility level "3" indicates that compatibility is poor. The compatibility levels are merely an example. A larger number of levels may be set as compatibility levels or only two levels "good" and "poor" may be employed as compatibility levels.

The priority is a priority of presentation of second information associated with a second element in a case where a first element is selected. Second information given a higher priority is presented more preferentially. The priority is decided on the basis of a compatibility level. A higher priority is given as compatibility becomes better. That is, a priority "first" corresponds to the compatibility level "1", a priority "second" corresponds to the compatibility level "2", and a priority "third" corresponds to the compatibility level "3". These priorities are merely an example. A larger number of priorities may be set as priorities or only "first" and "second" may be set as priorities.

The priority may be weighted on the basis of a history of user's use of a cooperative function and an element. For example, the priority is weighted by using a weight coefficient that corresponds to a use frequency. The priority is weighted by using a larger weight coefficient as the use efficiency becomes higher. For example, a larger weight coefficient is used as the number of times of use becomes larger. For example, a priority associated with a cooperative function that is used more frequently is weighted by using a larger weight coefficient. As a result, a priority of a cooperative function that is used more frequently tends to be higher than a priority of a cooperative function that is less frequently used. Furthermore, a priority associated with a cooperative function that is executable with the use of an element that is more frequently registered may be weighted by using a larger weight coefficient. As a result, a priority of a cooperative function that is executable with the use of an element that is more frequently used tends to be higher than a priority of a cooperative function that is executable with the use of an element that is less frequently used.

The image processing is image processing that is applied to a second image associated with a second element in a case where a first element is selected. The image processing is, for example, processing for deleting an image (processing for hiding an image), processing for making an image gray, or processing for making an image transparent. Although a transparency level in the processing for making an image transparent is illustrated in the example illustrated in FIG. 4, this is merely an example, and a level or the like in the processing for deleting an image or the processing for making an image gray may be registered as the image processing in the cooperative function management table. The transparency level is information indicative of a degree of transparency of a second image. A value in a range from 1 to 3 is given in advance as a transparency level in accordance with a priority (i.e., a compatibility level). A higher transparency level (degree of transparency) is given as a priority becomes lower (i.e., compatibility becomes poorer). That is, a transparency level "1" corresponds to the priority "first", a transparency level "2" corresponds to the priority "second", and a transparency level "3" corresponds to the priority "third". The transparency level "1" indicates non-transparency, the transparency level "2" indicates an intermediate degree of transparency, and the transparency level "3" indicates a highest level of transparency. For example, a degree of transparency of the transparency level "1" is "0%", a degree of transparency of the transparency level "2" is "30%", and a degree of transparency of the transparency level "3" is "80%". The transparency levels are merely an example. A larger number of transparency levels may be set as transparency levels or two levels "non-transparent" and "transparent" may be set as transparency levels. The values of degrees of transparency are merely an example, and values other than the values described above may be used. A degree of transparency may be changed and contents of image processing may be changed, for example, by a user or an administrator.

Cooperative functions registered in the cooperative function management table are described in detail below.

A "scan transfer function" is registered as a cooperative function given an ID "1". A combination of a "multifunction printer A" and a "PC (B1)" that are apparatuses is associated with the scan transfer function as elements used for this cooperative function. That is, the scan transfer function is a cooperative function that is executable with the use of the multifunction printer A and the PC (B1). The scan transfer function is a function of transferring, to the PC (B1), image data generated by scan using the multifunction printer A. A compatibility level between the multifunction printer A and the PC (B1) is "1", a corresponding priority is "first", and a corresponding transparency level is "1". That is, the multifunction printer A and the PC (B1) are apparatuses that have good compatibility. The compatibility is decided, for example, depending on performance of the multifunction printer A and the PC (B1), kinds of functions of the multifunction printer A and the PC (B1), and manufacturers of the multifunction printer A and the PC (B1). For example, apparatuses manufactured by the same manufacturer may be acknowledged as being apparatuses that have better compatibility than apparatuses manufactured by different manufacturers. Furthermore, apparatuses that share a larger number of executable cooperative functions may be acknowledged as being apparatuses that have better compatibility than apparatuses that share a smaller number of executable cooperative functions. Furthermore, an apparatus that has a special function may be acknowledged as being an apparatus that has good compatibility with another apparatus. Furthermore, an apparatus that has higher performance may be acknowledged as being an apparatus that has good compatibility with another apparatus. These acknowledgement methods are merely examples, and compatibility may be decided in consideration of other factors.

For example, in a case where an apparatus image associated with the multifunction printer A is selected by a user in a state where the apparatus image associated with the multifunction printer A and an apparatus image associated with the PC (B1) are displayed on the display, the notification controller 24 causes the apparatus image associated with the PC (B1) to be displayed on the display as an image having a degree of transparency "0%". That is, the apparatus image associated with the PC (B1) is displayed as a non-transparent image. Note that the multifunction printer A corresponds to a first element, and the PC (B1) corresponds to a second element. Similarly, in a case where the apparatus image associated with the PC (B1) is selected by the user, the notification controller 24 causes the apparatus image associated with the multifunction printer A to be displayed on the display as an image having a degree of transparency "0%". In this case, the PC (B1) corresponds to a first element, and the multifunction printer A corresponds to a second element.

A "print function" is registered as a cooperative function given an ID "2". A combination of the "multifunction printer A" and a "PC (B2)" that are apparatuses are associated with the print function as elements used for this cooperative function. That is, the print function is a cooperative function that is executable with the use of the multifunction printer A and the PC (B2). The print function is a function of transmitting data (e.g., a document file or an image file) stored in the PC (B2) to the multifunction printer A and printing the data with the use of the multifunction printer A. A compatibility level between the multifunction printer A and the PC (B2) is "2", a corresponding priority is "second", and a corresponding transparency level is "2". That is, compatibility between the multifunction printer A and the PC (B2) is an average level.

For example, in a case where an apparatus image associated with the multifunction printer A is selected by a user in a state where the apparatus image associated with the multifunction printer A and an apparatus image associated with the PC (B2) are displayed on the display, the notification controller 24 causes the apparatus image associated with the PC (B2) to be displayed on the display as an image having a degree of transparency "30%". Note that the multifunction printer A corresponds to a first element, and the PC (B2) corresponds to a second element. Similarly, in a case where the apparatus image associated with the PC (B2) is selected by the user, the notification controller 24 causes the apparatus image associated with the multifunction printer A to be displayed on the display as an image having a degree of transparency "30%". In this case, the PC (B2) corresponds to a first element, and the multifunction printer A corresponds to a second element.

Although a PC is used as an apparatus in the IDs "1" and "2", compatibility sometimes differs depending on an individual difference of the PC. This is described below by using the above example. Compatibility between the multifunction printer A and the PC (B1) is "good", whereas compatibility between the multifunction printer A and the PC (B2) is "average". Since compatibility depending on an individual difference is set as described above, image processing reflecting the individual difference is applied to an image associated with an element.

A "projecting function" is registered as a cooperative function given an ID "3". A combination of a "projector C" and the "PC (B1)" that are apparatuses is associated with the projecting function as elements used for this cooperative function. That is, the projecting function is a cooperative function that is executable with the use of the projector C and the PC (B1). The projecting function is a function of transmitting data (e.g., a document file or an image file) stored in the PC (B1) to the projector C and projecting the data onto an object by using the projector C. A compatibility level between the projector C and the PC (B1) is "2", a corresponding priority is "second", and a corresponding transparency level is "2".

A "lighting function" is registered as a cooperative function given an ID "4". A combination of a "door opening/closing sensor D" and a "lighting device E" that are apparatuses is associated with the lighting function as elements used for this cooperative function. That is, the lighting function is a cooperative function that is executable with the use of the door opening/closing sensor D and the lighting device E. The lighting function is a function of turning the lighting device E on in a case where the door opening/closing sensor D detects opening of a door. A compatibility level between the door opening/closing sensor D and the lighting device E is "3", a corresponding priority is "third", and a corresponding transparency level is "3". That is, the door opening/closing sensor D and the lighting device E are apparatuses that have poor compatibility.

For example, in a case where an apparatus image associated with the door opening/closing sensor D is selected by a user in a state where the apparatus image associated with the door opening/closing sensor D and an apparatus image associated with the lighting device E are displayed on the display, the notification controller 24 causes the apparatus image associated with the lighting device E to be displayed on the display as an image having a degree of transparency "80%". Note that the door opening/closing sensor D corresponds to a first element, and the lighting device E corresponds to a second element. Similarly, in a case where the apparatus image associated with the lighting device E is selected by the user, the notification controller 24 causes the apparatus image associated with the door opening/closing sensor D to be displayed on the display as an image having a degree of transparency "80%". In this case, the lighting device E corresponds to a first element, and the door opening/closing sensor D corresponds to a second element.

A "password function" is registered as a cooperative function given an ID "5". A combination of "document creation software F" and "password setting software G" that are software is associated with the password function as elements used for this cooperative function. That is, the password function is a cooperative function that is executable with the use of the document creation software F and the password setting software G. The password function is a function of setting a password for a document file that is being edited or displayed by the document creation software F by using the password setting software G. A compatibility level between the document creation software F and the password setting software G is "1", a corresponding priority is "first", and a corresponding transparency level is "1".

For example, in a case where a software image associated with the document creation software F is selected by a user in a state where the software image associated with the document creation software F and a software image associated with the password setting software G are displayed on the display, the notification controller 24 causes the software image associated with the password setting software G to be displayed on the display as an image having a degree of transparency "0%". Note that the document creation software F corresponds to a first element, and the password setting software G corresponds to a second element. Similarly, in a case where the software image associated with the password setting software G is selected by the user, the notification controller 24 causes the software image associated with the document creation software F to be displayed on the display as an image having a degree of transparency "0%". In this case, the password setting software G corresponds to a first element, and the document creation software F corresponds to a second element.

A "document transmission function" is registered as a cooperative function given an ID "6". A combination of the "document creation software F" and "data transmission software H" that are software is associated with the document transmission function as elements used for this cooperative function. That is, the data transmission function is a cooperative function that is executable with the use of the document creation software F and the data transmission software H. The data transmission function is a function of transmitting a document file that is being edited or displayed by the document creation software F to a destination by using the data transmission software H. A compatibility level between the document creation software F and the data transmission software H is "2", a corresponding priority is "second", and a corresponding transparency level is "2".

A "file adding function" is registered as a cooperative function given an ID "7". A combination of a "document file J" and an "accounting file K" that are targets is associated with the file adding function as elements used for this cooperative function. That is, the file adding function is a cooperative function that is executable with the use of the document file J and the accounting file K. The file adding function is a function of adding contents of the document file J to the accounting file K. For example, document creation software is associated with the document file J, accounting software is associated with the accounting file K, and the file adding function is executed through cooperation of the document creation software and the accounting software. A compatibility level between the document file J and the accounting file K is "3", a corresponding priority is "third", and a corresponding transparency level is "3".

For example, in a case where a target image associated with the document file J is selected by a user in a state where the target image associated with the document file J and a target image associated with the accounting file K are displayed on the display, the notification controller 24 causes the target image associated with the accounting file K to be displayed on the display as an image having a degree of transparency "80%". Note that the document file J corresponds to a first element, and the accounting file K corresponds to a second element. Similarly, in a case where the target image associated with the accounting file K is selected by the user, the notification controller 24 causes the target image associated with the document file J to be displayed on the display as an image having a degree of transparency "80%". In this case, the accounting file K corresponds to a first element, and the document file J corresponds to a second element.

Although the cooperative function is a function that is executable through cooperation of plural apparatuses, plural pieces of software, or plural targets (e.g., files), the cooperative function may be a function that is executable through cooperation of an apparatus and software, may be a function that is executable through cooperation of an apparatus and a target, or may be a function that is executable through cooperation of software and a target. This is described in detail below.

A "character recognizing function" is registered as a cooperative function given an ID "8". A combination of the "multifunction printer A" that is an apparatus and the "character recognizing software L" that is software is associated with the character recognizing function as elements used for this cooperative function. That is, the character recognizing function is a cooperative function that is executable with the use of the multifunction printer A and the character recognizing software L. The character recognizing function is a function of scanning a document with the use of the multifunction printer A and applying character recognizing processing to an image generated by the scan with the use of the character recognizing software L. A compatibility level between the multifunction printer A and the character recognizing software L is "2", a corresponding priority is "second", and a corresponding transparency level is "2".

For example, in a case where an apparatus image associated with the multifunction printer A is selected by a user in a state where the apparatus image associated with the multifunction printer A and a software image associated with the character recognizing software L are displayed on the display, the notification controller 24 causes the software image associated with the character recognizing software L to be displayed on the display as an image having a degree of transparency "30%". Note that the multifunction printer A corresponds to a first element, and the character recognizing software L corresponds to a second element. Similarly, in a case where the software image associated with the character recognizing software L is selected by the user, the notification controller 24 causes the apparatus image associated with the multifunction printer A to be displayed on the display as an image having a degree of transparency "30%". In this case, the character recognizing software L corresponds to a first element, and the multifunction printer A corresponds to a second element.

A "print function" is registered as a cooperative function given an ID "9". A combination of the "multifunction printer A" that is an apparatus and the "document file J" that is a target is associated with the print function as elements used for this cooperative function. That is, the print function is a cooperative function that is executable with the use of the multifunction printer A and the document file J. The print function is a function of printing the document file J with the use of the multifunction printer A. A compatibility level between the multifunction printer A and the document file J is "1", a corresponding priority is "first", and a corresponding transparency level is "1".

For example, in a case where the apparatus image associated with the multifunction printer A is selected by a user in a state where the apparatus image associated with the multifunction printer A and a target image associated with the document file J are displayed on the display, the notification controller 24 causes the target image associated with the document file J to be displayed on the display as an image having a degree of transparency "0%". Note that the multifunction printer A corresponds to a first element, and the document file J corresponds to a second element. Similarly, in a case where the target image associated with the document file J is selected by the user, the notification controller 24 causes the apparatus image associated with the multifunction printer A to be displayed on the display as an image having a degree of transparency "0%". In this case, the document file J corresponds to a first element, and the multifunction printer A corresponds to a second element.

A "character extraction function" is registered as a cooperative function given an ID "10". A combination of the "character recognizing software L" that is software and an "image file M" that is a target is associated with the character extraction function as elements used for this cooperative function. That is, the character extraction function is a cooperative function that is executable with the use of the character recognizing software L and the image file M. The character extraction function is a function of applying character recognizing processing to the image file M with the use of the character recognizing software L. A compatibility level between the character recognizing software L and the image file M is "2", a corresponding priority is "second", and a corresponding transparency level is "2".

For example, in a case where a software image associated with the character recognizing software L is selected by a user in a state where the software image associated with the character recognizing software L and a target image associated with the image file M are displayed on the display, the notification controller 24 causes the target image associated with the image file M to be displayed on the display as an image having a degree of transparency "30%". Note that the character recognizing software L corresponds to a first element, and the image file M corresponds to a second element. Similarly, in a case where the target image associated with the image file M is selected by the user, the notification controller 24 causes the software image associated with the character recognizing software L to be displayed on the display as an image having a degree of transparency "30%". In this case, the image file M corresponds to a first element, and the character recognizing software L corresponds to a second element.

Although each of the cooperative functions is a function that is executable with the use of two elements, the cooperative function may be a function that is executable with the use of three or more elements. This is described in detail below.

A "file adding function" is registered as a cooperative function given an ID "11". A combination of a "scanner N" that is an apparatus, the "character recognizing software L" that is software, "form creation software P" that is software, a "receipt" that is a target, and an "accounting file Q" that is a target is associated with the file adding function as elements used for this cooperative function. That is, the file adding function is a cooperative function that is executable with the use of the scanner N, the character recognizing software L, the form creation software P, the receipt, and the accounting file Q. The file adding function is a function of scanning the receipt with the use of the scanner N, extracts a character string from an image generated by the scan by applying character recognizing processing to the image with the use of the character recognizing software L, and adding the character string to the accounting file Q with the use of the form creation software P. A compatibility level among the elements used for the file adding function is "3", a corresponding priority is "third", and a corresponding transparency level is "3". In a case where an image associated with one of the elements used for the file adding function is selected by a user, the notification controller 24 causes images of the other elements to be displayed as images having a degree of transparency "80%". In this case, the one of the elements corresponds to a first element, and the other elements correspond to second elements.

A "shopping function" is registered as a cooperative function given an ID "12". A combination of a "web browser R" that is software, a "shopping site S" that is a target, and "clothing T" that is a target (shopping target) is associated with the shopping function as elements used for this cooperative function. That is, the shopping function is a cooperative function that is executable with the use of the web browser R, the shopping site S, and the clothing T. The shopping function is a function of monitoring the shopping site S with the use of the web browser R and executing processing for purchasing the clothing T in a case where the clothing T is put on sale on the shopping site S. A compatibility level among the elements used for the shopping function is "2", a corresponding priority is "second", and a corresponding transparency level is "2". In a case where an image associated with one of the elements used for the shopping function is selected by a user, the notification controller 24 causes images of the other elements to be displayed as images having a degree of transparency "30%". In this case, the one of the elements corresponds to a first element, and the other elements correspond to second elements.

The cooperative functions illustrated in FIG. 4 are merely examples, and cooperative functions other than the above cooperative functions may be registered in the cooperative function management table. For example, the cooperative function may be a function that is executable with the use of an IoT (Internet of Things) apparatus. Furthermore, a cooperative function may be used in a connected home (a system in which apparatuses such as home electrical appliances are connected over a network by using an IoT technology). In this case, the apparatuses may be connected over a specific server or the apparatuses may be connected without a specific server.

Furthermore, a cooperative function may be executed through cooperation of plural elements with the use of IFTTT. That is, the cooperative function may be a function of causing, upon occurrence of a triggering event in an element, another element to execute an action (process). For example, the cooperative function "lighting function" given an ID "4" is a function of executing an action of turning the lighting device E on upon occurrence of a trigger, specifically, when the door opening/closing sensor D detects opening of a door. Furthermore, the cooperative function "shopping function" given an ID "12" is a function of executing an action of purchasing the clothing T upon occurrence of a trigger, specifically, when the clothing T is put on sale. Furthermore, a function of causing an action executed by an element to trigger an action of another element may be encompassed in a cooperative function according to the first exemplary embodiment. Furthermore, a function of causing plural web services to cooperate with one another and application programming interface cooperation for causing plural systems, services, or the like to cooperate with one another by using an API may be encompassed in the cooperative function according to the first exemplary embodiment.

The apparatus 12 that executes a function may be controlled by the relay device 14 or may be controlled by the terminal device 10. In a case where the apparatus 12 is controlled by the relay device 14, the relay device 14 controls the apparatus 12 by transmitting, to the apparatus 12, a control signal for controlling operation of the apparatus 12. In a case where the apparatus 12 is controlled by the terminal device 10, the terminal device 10 controls the apparatus 12 by transmitting, to the apparatus 12, the control signal directly or via the relay device 14. The relay device 14 may transmit a control signal to another relay device, and the other relay device may control the apparatuses 12. The relay device 14 may transmit a control signal to a server, and the server may control the apparatuses 12.

A part of the apparatus 12 may be used as hardware. For example, in a case where the apparatus 12 has plural functions and where a function is allocated to each part of the apparatus 12, an independent function or a cooperative function that is executable with the use of a part of the apparatus 12 may be defined. This is described below by using a specific example. Assume that a print function is allocated to a body of a multifunction printer, a scan function is allocated to a reading part (e.g., a part that corresponds to a document cover, document glass, and an automatic document feeder) of the multifunction printer, and a post-processing function (e.g., a stapling function) is allocated to a post-processing device of the multifunction printer. In a case where the scan function is used, the reading part of the multifunction printer may be used as an element. Furthermore, an assembled function allocated to each block such as robotics process automation (RPA) may be used as software.

Operation of the terminal device 10 according to the first exemplary embodiment is described in detail below.

Figure 5:
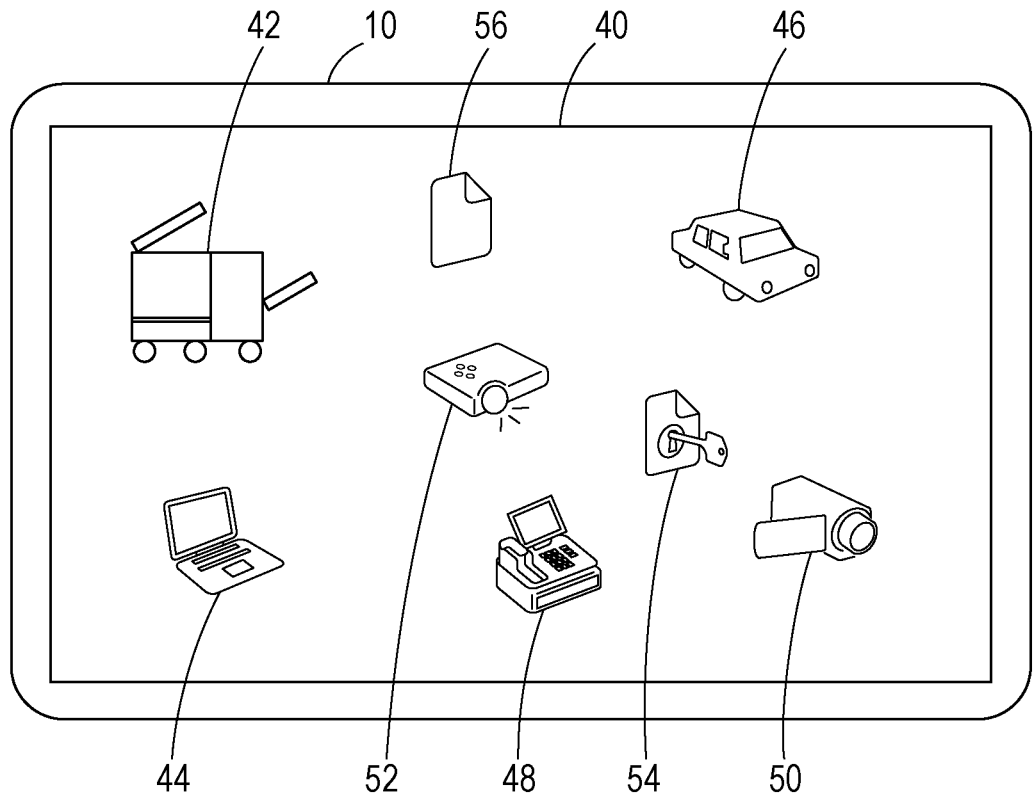
FIG. 5 illustrates a screen.

FIG. 5 illustrates a screen 40 displayed on the display of the UI unit 18. The screen 40 is, for example, a home screen or a desktop screen. On the screen 40, an apparatus image associated with an apparatus, a software image associated with software, a target image associated with a target (e.g., a target image associated with a file), and the like are displayed. For example, an apparatus image 42 associated with the multifunction printer 26, an apparatus image 44 associated with the notebook PC 28, an apparatus image 46 associated with the automobile 30, an apparatus image 48 associated with the cash register 32, an apparatus image 50 associated with the video camera 36, an apparatus image 52 associated with the projector 38, a software image 54 associated with the password setting software X, and a target image 56 associated with the document file Y are displayed on the screen 40.

In a case where a user selects the apparatus image 42 associated with the multifunction printer 26 by operating the UI unit 18 on the screen 40, the notification controller 24 specifies a non-compliant element (second element) that is not registered in the cooperative function management table as an element that executes a cooperative function in cooperation with the multifunction printer 26 from among the elements displayed on the screen 40 while referring to the cooperative function management table. The notification controller 24 may specify a compliant element (second element) registered in the cooperative function management table as an element that executes a cooperative function in cooperation with the multifunction printer 26 from among the elements displayed on the screen 40. The multifunction printer 26 corresponds to a first element, and elements other than the multifunction printer 26 correspond to second elements.

Figure 6:
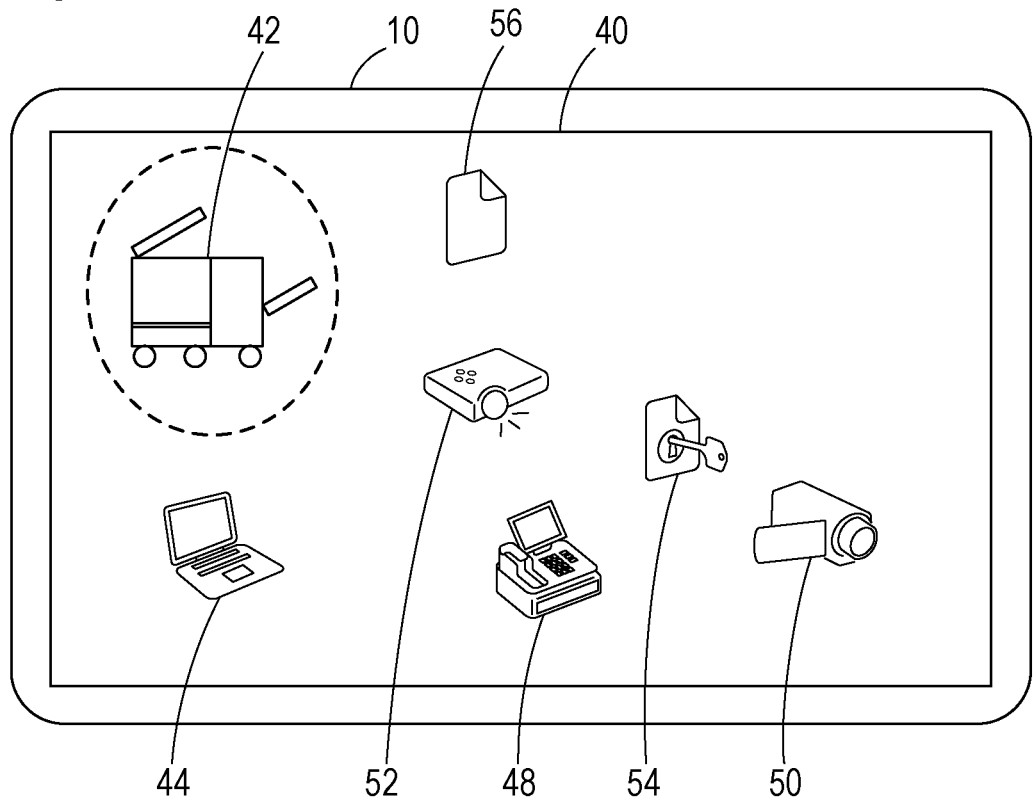
FIG. 6 illustrates a screen.

For example, assume that the notebook PC 28, the cash register 32, the video camera 36, the projector 38, the password setting software X, and the document file Y are registered in the cooperative function management table as compliant elements in relation to the multifunction printer 26 and that the automobile 30 is not registered in the cooperative function management table as a compliant element in relation to the multifunction printer 26. That is, the automobile 30 is a non-compliant element that is not registered in the cooperative function management table as an element that executes a cooperative function in cooperation with the multifunction printer 26. In this case, the notification controller 24 deletes the apparatus image 46 associated with the automobile 30 from the screen 40 as illustrated in FIG. 6. That is, the apparatus image 46 is not displayed on the screen 40.

Since an image associated with a non-compliant element is deleted from the screen 40 and an image associated with a compliant element remains on the screen 40 without being deleted from the screen 40 as described above, the compliant element defined as an element that executes a cooperative function in cooperation with a selected element (e.g., the multifunction printer 26) can be easily recognized by a user.

Alternatively, the notification controller 24 may display the apparatus image 46 in a gray-out state on the screen 40, may display the apparatus image 46 in a semi-transparent state on the screen 40, may cause the apparatus image 46 to blink, may reduce a display size of the apparatus image 46, may vibrate the apparatus image 46, or may deform the apparatus image 46. Even in such a case, an image associated with a non-compliant element and an image associated with a compliant element are displayed in a distinguishable manner, and therefore the compliant element defined as an element that executes a cooperative function in cooperation with the multifunction printer 26 can be easily recognized by a user.

Although an apparatus image is selected by a user in the example illustrated in FIGS. 5 and 6, processing similar to the processing described above is performed even in a case where a software image or a target image is selected by a user.

The notification controller 24 may display an image associated with each element on the screen 40 by changing a degree of transparency of the image in accordance with compatibility between elements. For example, in a case where a compatibility level between the multifunction printer 26 and the automobile 30 is "3" and a corresponding transparency level is "3", the notification controller 24 causes the apparatus image 46 associated with the automobile 30 to be displayed on the screen 40 as an image having a degree of transparency "80%". In a case where a compatibility level between each of the elements other than the automobile 30 and the multifunction printer 26 is "1" and a corresponding transparency level is "1", the notification controller 24 causes images associated with the elements other than the automobile 30 to be displayed on the screen 40 as images having a degree of transparency "0%". This allows a user to be visually notified of information concerning compatibility between elements in execution of a cooperative function.

The notification controller 24 may display an image associated with each element on the screen 40 by changing a display size of the image in accordance with compatibility between elements. For example, a maximum size corresponds to the compatibility level "1", a middle size corresponds to the compatibility level "2", and a minimum size corresponds to the compatibility level "3". The notification controller 24 causes each image to be displayed on the screen 40 in a display size corresponding to a compatibility level. For example, in a case where a compatibility level between the multifunction printer 26 and the automobile 30 is "3", the notification controller 24 sets a display size of the apparatus image 46 associated with the automobile 30 to a minimum level and causes the apparatus image 46 reduced to the minimum level to be displayed on the screen 40. In a case where a compatibility level between each of the elements other than the automobile 30 and the multifunction printer 26 is "1", the notification controller 24 sets a display size of images associated with the elements other than the automobile to a maximum level and causes the images enlarged to the maximum level to be displayed on the screen 40. This allows a user to be visually notified of information concerning compatibility between elements in execution of a cooperative function.

The notification controller 24 may display an image associated with each element on the screen 40 by changing a mode of blinking of the image in accordance with compatibility between elements. For example, a maximum blinking speed corresponds to the compatibility level "1", a middle blinking speed corresponds to the compatibility level "2", and a minimum blinking speed corresponds to the compatibility level "3". The notification controller 24 causes each image to be displayed on the screen 40 while blinking at a blinking speed corresponding to a compatibility level. For example, in a case where a compatibility level between the multifunction printer 26 and the automobile 30 is "3", the notification controller 24 sets a blinking speed of the apparatus image 46 associated with the automobile 30 to a minimum speed and causes the apparatus image 46 to be displayed on the screen 40 while blinking at the minimum speed. In a case where a compatibility level between each of the elements other than the automobile 30 and the multifunction printer 26 is "1", the notification controller 24 sets a blinking speed of images associated with the elements other than the automobile to a maximum speed and causes the images to be displayed on the screen 40 while blinking at the maximum speed. This allows a user to be visually notified of information concerning compatibility between elements in execution of a cooperative function. The minimum blinking speed may correspond to the compatibility level "1", and the maximum blinking speed may correspond to the compatibility level "3".

The notification controller 24 may display an image associated with each element on the screen 40 by changing a vibration level of the image in accordance with compatibility between elements. For example, a maximum degree of vibration or a maximum number of vibrations corresponds to the compatibility level "1", an intermediate degree of vibration or an intermediate number of vibrations corresponds to the compatibility level "2", and a minimum degree of vibration or a minimum number of vibrations corresponds to the compatibility level "3". The notification controller 24 causes each image to be displayed on the screen 40 while vibrating the image in degree of vibration or number of vibrations corresponding to a compatibility level. For example, in a case where a compatibility level between the multifunction printer 26 and the automobile 30, the notification controller 24 sets a degree of vibration or the number of vibrations of the apparatus image 46 associated with the automobile 30 to a minimum degree of vibration or a minimum number of vibrations and causes the apparatus image 46 to be displayed on the screen 40 while vibrating the apparatus image 46 in the minimum degree of vibration or minimum number of vibrations. In a case where a compatibility level between each of the elements other than the automobile 30 and the multifunction printer 26 is "1", the notification controller 24 sets a degree of vibration and the number of vibrations of images associated with the elements other than the automobile to a maximum degree of vibration or a maximum number of vibrations and causes the images to be displayed on the screen 40 while vibrating the images in the maximum degree of vibration or maximum number of vibrations. This allows a user to be visually notified of information concerning compatibility between elements in execution of a cooperative function. The minimum degree of vibration or minimum number of vibrations may correspond to the compatibility level "1", and the maximum degree of vibration or maximum number of vibrations may correspond to the compatibility level "3". The notification controller 24 may change a mode of vibration in accordance with a compatibility level.

The notification controller 24 may display an image associated with each element on the screen 40 by deforming the image in accordance with compatibility between elements. For example, a minimum deformation amount corresponds to the compatibility level "1", an intermediate deformation amount corresponds to the compatibility level "2", and a maximum deformation amount corresponds to the compatibility level "3". The notification controller 24 causes each image to be displayed on the screen 40 by deforming the image in a deformation amount corresponding to a compatibility level. For example, in a case where a compatibility level between the multifunction printer 26 and the automobile 30 is "3", the notification controller 24 causes the apparatus image 46 associated with the automobile 30 to be displayed on the screen 40 by deforming the apparatus image 46 in the maximum deformation amount. In a case where a compatibility level between each of the elements other than the automobile 30 and the multifunction printer 26 is "1", the notification controller 24 causes images associated with the elements other than the automobile to be displayed on the screen 40 by deforming the images in the minimum deformation amount. This allows a user to be visually notified of information concerning compatibility between elements in execution of a cooperative function. The notification controller 24 may change a shape of each image depending on a compatibility level.

The notification controller 24 may change at least one of attributes including a degree of transparency, a display size, a mode of blinking, a vibration level, and a deformation amount in accordance with a compatibility level. That is, the notification controller 24 may change a single attribute or may change plural attributes.

The notification controller 24 may change an image associated with an element that has compatibility poorer than reference compatibility. A mode of the change is deletion, gray-out display, semi-transparent display, blinking, reduction in size, vibration, deformation, or the like of the image. The reference compatibility is, for example, the compatibility level "2". For example, in a case where a compatibility level between the multifunction printer 26 and the automobile 30 is "3", which is poorer than the reference compatibility, i.e., lower than the reference compatibility, the notification controller 24 changes the apparatus image 46 associated with the automobile 30. In a case where a compatibility level between each of the elements other than the automobile 30 and the multifunction printer 26 is "1" or "2", which is better than the reference compatibility, i.e., higher than the reference compatibility, the notification controller 24 does not change images associated with the elements other than the automobile. This allows a user to be visually notified of an element having compatibility equal to or higher than the reference compatibility.

In a case where a user selects an image associated with a compliant element and gives an instruction to display a cooperative function by operating the UI unit 18 on the screen 40, the notification controller 24 causes information indicative of a cooperative function that is executable with the use of the multifunction printer 26 and the compliant element to be displayed on the display of the UI unit 18. More specifically, the notification controller 24 specifies a cooperative function associated with a combination of the multifunction printer 26 and the compliant element in the cooperative function management table and causes information indicative of the cooperative function to be displayed on the display. For example, in a case where the notebook PC 28 is selected as a compliant element by a user, the notification controller 24 specifies a cooperative function associated with a combination of the multifunction printer 26 and the notebook PC 28 in the cooperative function management table. For example, assume that the cooperative function is the "scan transfer function". In this case, the notification controller 24 causes information indicative of the scan transfer function to be displayed on the display. In a case where plural cooperative functions (e.g., the scan transfer function and the print function) are associated with the combination of the multifunction printer 26 and the notebook PC 28, the notification controller 24 causes information indicative of the plural cooperative functions to be displayed on the display. In a case where the user gives an instruction to execute a cooperative function by designating the cooperative function to be executed by operating the UI unit 18, the cooperative function is executed. In a case where an apparatus is used for the cooperative function, a control signal is transmitted to the apparatus from the terminal device 10 or the relay device 14, and the apparatus executes the cooperative function in accordance with the control signal. In a case where software installed in the terminal device 10 is used for the cooperative function, the controller 22 executes the software. In a case where the software is installed in an external device such as the relay device 14 or a server, the software is executed by the external device.

Figure 7:
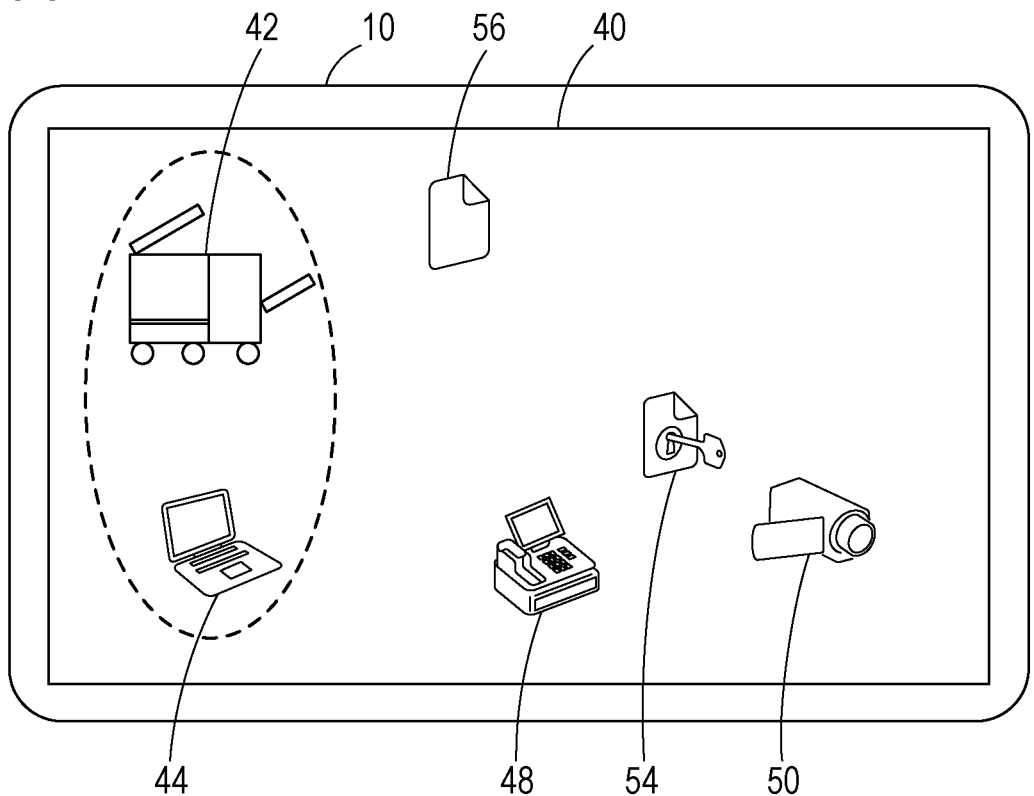
FIG. 7 illustrates a screen.

In a case where a compliant element (second element) is further selected by the user after the first image is selected by the user, the notification controller 24 specifies a non-compliant element (other second element) that is not registered in the cooperative function management table as an element that executes a cooperative function in cooperation with the selected first element and the compliant element from among the elements displayed on the screen 40 while referring to the cooperative function management table. For example, as illustrated in FIG. 7, in a case where the apparatus image 42 associated with the multifunction printer 26 is selected as an image associated with the first element and the apparatus image 44 associated with the notebook PC 28 is further selected as an image associated with the compliant element, the notification controller 24 specifies a non-compliant element that is not registered in the cooperative function management table as an element that executes a cooperative function in cooperation with the multifunction printer 26 and the notebook PC 28.

For example, assume that the cash register 32, the video camera 36, the password setting software X, and the document file Y are registered in the cooperative function management table as compliant elements in relation to the multifunction printer 26 and the notebook PC 28 and that the projector 38 is not registered in the cooperative function management table as a compliant element in relation to the multifunction printer 26 and the notebook PC 28. That is, the projector 38 is a non-compliant element that is not registered in the cooperative function management table as an element that executes a cooperative function in cooperation with the multifunction printer 26 and the notebook PC 28. In this case, the notification controller 24 deletes the apparatus image 52 associated with the projector 38 from the screen 40 as illustrated in FIG. 7. That is, the apparatus image 52 is not displayed on the screen 40.

As described above, the apparatus image 46 associated with the automobile 30 is deleted from the screen 40 when the apparatus image 42 associated with the multifunction printer 26 is selected, and then the apparatus image 52 associated with the projector 38 is deleted from the screen 40 when the apparatus image 44 associated with the notebook PC 28 is selected. In this way, in a case where elements are sequentially selected by a user, images associated with non-compliant elements are sequentially deleted from the screen 40. As a result, images associated with compliant elements remain on the screen 40 without being deleted from the screen 40. This allows the user to easily recognize the compliant elements defined as elements that execute a cooperative function in cooperation with the multifunction printer 26 and the notebook PC 28.

The notification controller 24 may display the apparatus image 52 in a gray-out state on the screen 40, may display the apparatus image 52 in a semi-transparent state on the screen 40, may cause the apparatus image 52 to blink, may reduce a display size of the apparatus image 52, may vibrate the apparatus image 52, or may deform the apparatus image 52.

The notification controller 24 may change a degree of transparency, a display size, a mode of blinking, a vibration level, or a deformation amount of an image associated with each of the elements in accordance with compatibility with the multifunction printer 26 and the notebook PC 28.

For example, in a case where a compatibility level between the projector 38 and the combination of the multifunction printer 26 and the notebook PC 28 is "3" and a corresponding transparency level is "3", the notification controller 24 causes the apparatus image 52 associated with the projector 38 to be displayed on the screen 40 as an image having a degree of transparency "80%". In a case where a compatibility level between each of the elements other than the projector 38 and the combination of the multifunction printer 26 and the notebook PC 28 is "1" and a corresponding transparency level is "1", the notification controller 24 causes images associated with the elements other than the projector 38 to be displayed on the screen 40 as images having a degree of transparency "0%". Since the automobile 30 is a non-compliant element, the apparatus image 46 associated with the automobile 30 is displayed on the screen 40 as an image having a degree of transparency "80%". An element (a display size, a blinking speed, vibration, or image deformation) other than a degree of transparency may be changed in accordance with a compatibility level.

In a case where selection of an image associated with an element is undone, the notification controller 24 returns a display state of an image associated with an element acknowledged as a non-compliant element in relation to the selected element to a display state before the selection (an original display state). For example, in a case where the image associated with the non-compliant element has been deleted from the screen 40, the notification controller 24 causes the image associated with the non-compliant element to be displayed on the screen 40. Furthermore, in a case where a degree of transparency, a display size, a mode of blinking, a vibration level, and a shape of the image associated with the non-compliant element are changed, the notification controller 24 returns these changes to original states. For example, in a case where selection of an image associated with a first element is undone by a user (e.g., in a case where selection is cancelled by the user) after the user selects the image associated with the first element, the notification controller 24 returns a display state of an image associated with an element acknowledged as a non-compliant element in relation to the first element to an original display state. Furthermore, in a case where selection of an image associated with a second element is undone after an image associated with a first element is selected and the image associated with the second element is selected by a user, the notification controller 24 returns a display state of an image associated with a non-compliant element in relation to the first element and the second element to an original display state.

Figure 8:
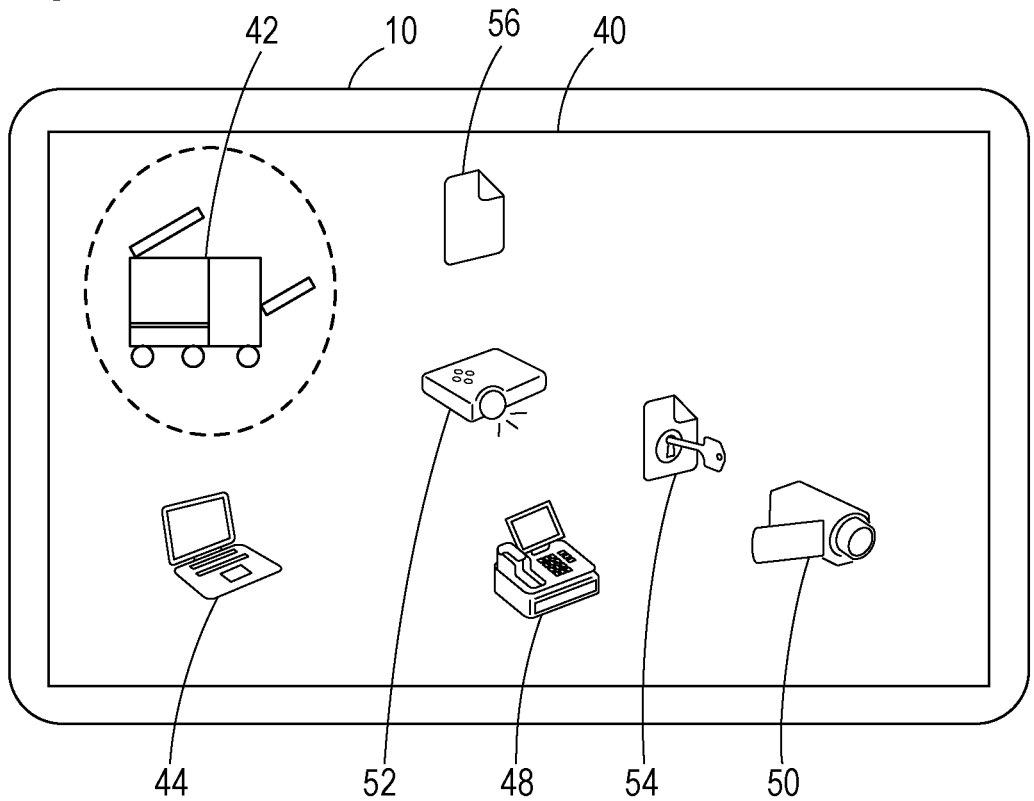
FIG. 8 illustrates a screen.

Processing performed in a case where selection of an image is undone is described in detail below. For example, as illustrated in FIG. 6, in a case where the apparatus image 42 associated with the multifunction printer 26 is being selected by a user, the apparatus image 46 associated with the automobile 30 is deleted from the screen 40. Furthermore, as illustrated in FIG. 7, in a case where the apparatus image 42 associated with the multifunction printer 26 and the apparatus image 44 associated with the notebook PC 28 are being selected by the user, the apparatus image 52 associated with the projector 38 is further deleted from the screen 40. As illustrated in FIG. 8, in a case where selection of the apparatus image 44 associated with the notebook PC 28 is undone in this state, i.e., in a case where selection of the apparatus image 44 is cancelled by the user in this state, the notification controller 24 causes the apparatus image 52 associated with the projector 38 to be displayed on the screen 40 since only the apparatus image 42 associated with the multifunction printer 26 is being selected. That is, in a case where both of the multifunction printer 26 and the notebook PC 28 are being selected, the projector 38 is acknowledged as a non-compliant element, but the projector 38 is a compliant element in relation to the multifunction printer 26 only. For this reason, in a case where selection of the notebook PC 28 is undone, the notification controller 24 causes the apparatus image 52 associated with the projector 38 to be displayed on the screen 40. This makes it possible to return a display state of an image to a state before selection of an image associated with an element by undoing selection of the image in a case where a situation such as erroneous selection of the image, erroneous operation, or retry of operation occurs.

The notification controller 24 may cause an image associated with a non-compliant element to be displayed at an original display position on the screen 40, may cause a frame to be displayed around the image, or may cause a message such as "Cooperation with apparatus has been undone, and image has been displayed again." to be displayed on the screen 40.

In a case where selection of the apparatus image 44 associated with the notebook PC 28 is undone and then selection of the apparatus image 42 associated with the multifunction printer 26 is further undone, the notification controller 24 causes the apparatus image 46 associated with the automobile 30 to be displayed on the screen 40 as illustrated in FIG. 5. That is, no element is being selected by the user, and therefore the notification controller 24 causes the apparatus image 46 associated with the automobile 30 to be displayed on the screen 40. In this way, in a case where selection of a first element is undone, second information associated with a second element is returned to an original state. Similarly, in a case where the apparatus image 42 associated with the multifunction printer 26 is selected and then the selection of the apparatus image 42 is undone before selection of an image other than the apparatus image 42, the notification controller 24 causes the apparatus image 46 associated with the automobile 30 to be displayed on the screen 40.

In a case where selection of the apparatus image 42 associated with the multifunction printer 26 that is a first element is undone in a state where both of the apparatus images 42 and 44 are being selected as illustrated in FIG. 7, the notification controller 24 returns a display state of an image associated with an element that is a non-compliant element in relation to the multifunction printer 26 to an original display state without returning a display state of an image associated with an element that is a non-compliant element in relation to the notebook PC 28 to an original display state. For example, in a case where the automobile 30 is a compliant element in relation to the notebook PC 28, i.e., in a case where a cooperative function that is executable with the use of the automobile 30 and the notebook PC 28 is registered in the cooperative function management table, the notification controller 24 causes the apparatus image 46 associated with the automobile 30 to be displayed on the screen 40 again. Meanwhile, in a case where the projector 38 is a non-compliant element in relation to the notebook PC 28, i.e., in a case where a cooperative function that is executable with the use of the projector 38 and the notebook PC 28 is not registered in the cooperative function management table, the notification controller 24 maintains a state where the apparatus image 52 associated with the projector 38 is not displayed. In this way, the notification controller 24 hides an image associated with an element that is a non-compliant element in relation to an element that is being selected by a user and causes an image other than the image associated with the non-compliant element to be displayed on the screen 40.

Although selection of an image associated with an apparatus is undone in the above example, processing similar to the above processing is performed even in a case where selection of an image associated with software or a target (e.g., a file) is undone.

Modifications of the first exemplary embodiment are described below.

Modification 1

Figure 9:
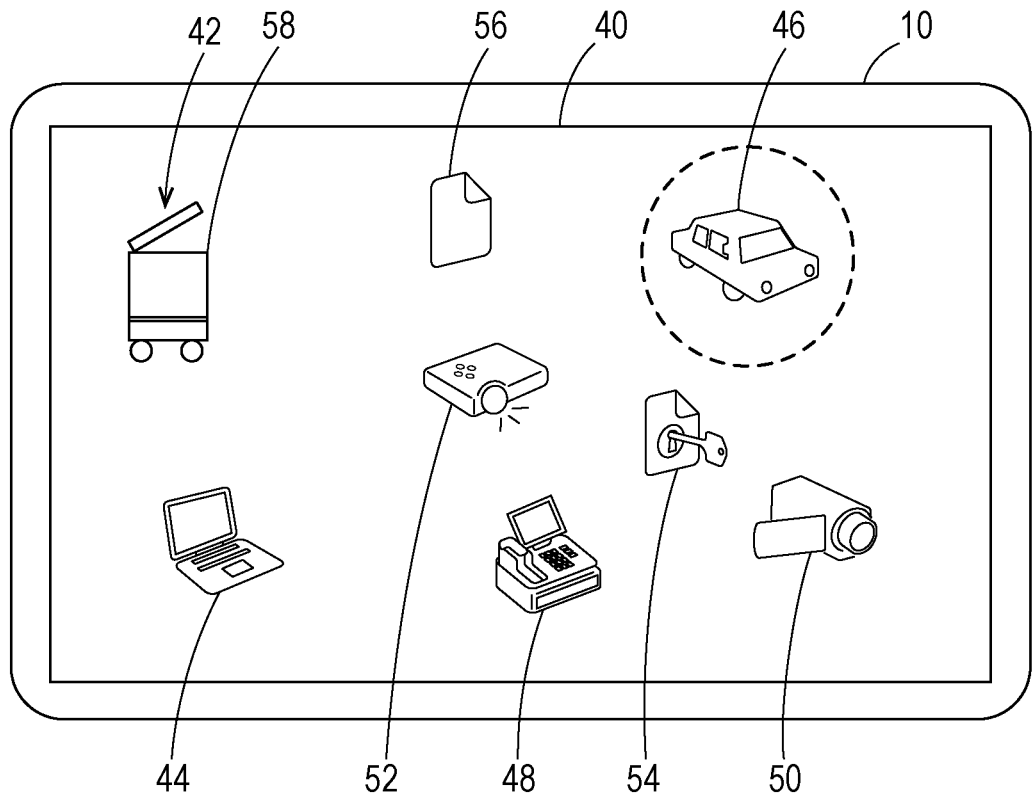
FIG. 9 illustrates a screen.
Figure 10:
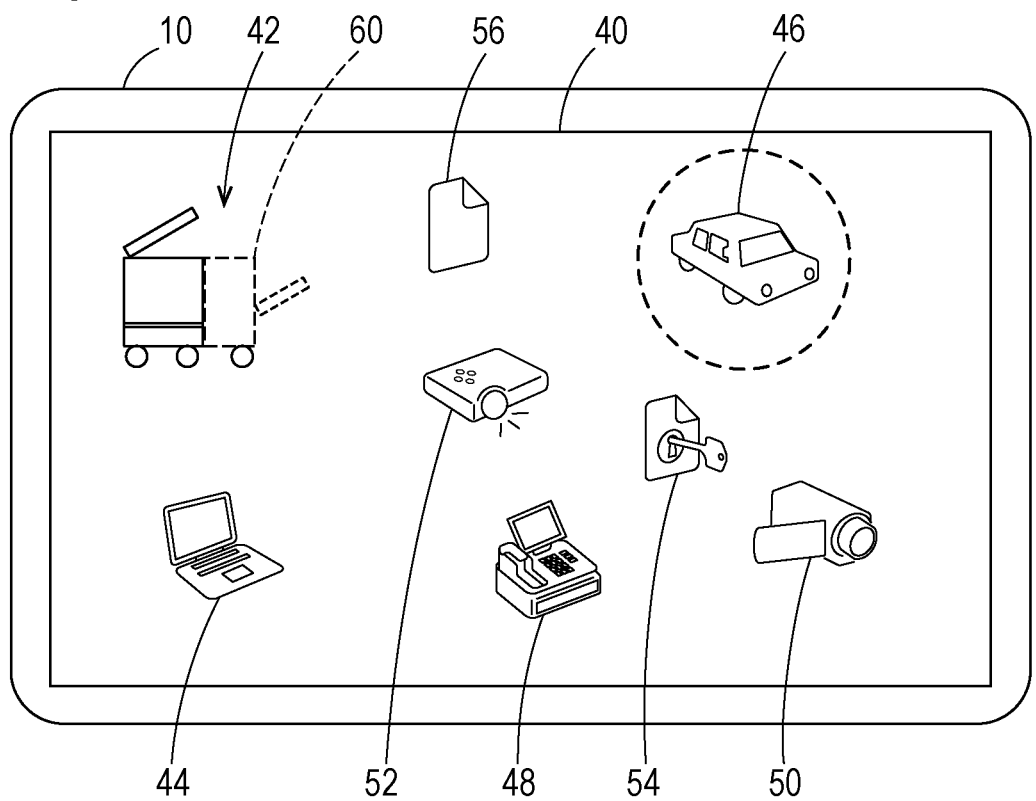
FIG. 10 illustrates a screen.

Modification 1 is described with reference to FIGS. 9 and 10. Modification 1 is a modification of the first exemplary embodiment. FIGS. 9 and 10 illustrate the screen 40. In Modification 1, in a case where a function is allocated to each part of an apparatus and where a part of the apparatus is a non-compliant element, the notification controller 24 changes an image associated with the part. Modification 1 is described in detail below.

For example, in a case where a user selects the apparatus image 46 associated with the automobile 30 on the screen 40 as illustrated in FIG. 9, the notification controller 24 specifies a non-compliant element (second element) that is not registered in the cooperative function management table as an element that executes a cooperative function in cooperation with the automobile 30 from among elements displayed on the screen 40 while referring to the cooperative function management table. For example, assume that a copy function, a scan function, and a print function are allocated to a body of the multifunction printer 26 and a post-processing function such as a stapling function is allocated to a post-processing part of the multifunction printer 26. In this case, assume that the body of the multifunction printer 26 is registered in the cooperative function management table as an element that executes a cooperative function in cooperation with the automobile 30, but the post-processing part of the multifunction printer 26 is not registered in the cooperative function management table as an element that executes a cooperative function in cooperation with the automobile 30. That is, the body of the multifunction printer 26 is a compliant element in relation to the automobile 30, but the post-processing part of the multifunction printer 26 is a non-compliant element in relation to the automobile 30. In this case, the notification controller 24 deletes an apparatus image (part image) associated with the post-processing part of the multifunction printer 26 from the screen 40 and causes the apparatus image 58 (part image) associated with the body of the multifunction printer 26 to be displayed on the screen 40, as illustrated in FIG. 9. That is, the apparatus image associated with the post-processing part is not displayed on the screen 40, and the apparatus image 58 associated with the body is displayed.

As described above, an image associated with a part that is a non-compliant element is deleted from the screen 40, and an image associated with a compliant element remains on the screen 40 without being deleted from the screen 40. This allows a user to easily recognize the compliant element defined as an element that executes a cooperative function in cooperation with a selected element (e.g., the automobile 30). In the example illustrated in FIG. 9, the user can easily recognize that the body of the multifunction printer 26 can execute a cooperative function in cooperation with the automobile 30.

In another example, the notification controller 24 may cause the apparatus image 60 (part image) associated with the post-processing part that is a non-compliant element to be displayed in a gray-out state on the screen 40 as illustrated in FIG. 10, may cause the apparatus image 60 to be displayed in a semi-transparent state on the screen 40, may cause the apparatus image 60 to blink, may reduce a display size of the apparatus image 60, may vibrate the apparatus image 60, or may deform the apparatus image 60.

In another example, the notification controller 24 may change a display state of an image associated with each part in accordance with a compatibility level. For example, in a case where a compatibility level between the body of the multifunction printer 26 and the automobile 30 is "1", the notification controller 24 causes the apparatus image 58 associated with the body of the multifunction printer 26 to be displayed on the screen 40 as an image having a degree of transparency "0%". In a case where a compatibility level between the post-processing part of the multifunction printer 26 and the automobile 30 is "3", the notification controller 24 causes the apparatus image 60 associated with the post-processing part of the multifunction printer 26 to be displayed on the screen 40 as an image having a degree of transparency "80%". As in the above case, the notification controller 24 may change at least one of attributes including a degree of transparency, a display size, a mode of blinking, a vibration level, and a deformation amount of an image associated with a part in accordance with a compatibility level.

The above processing for a part may also be performed for software and a target. For example, in a case where software has plural functions, the notification controller 24 may change a display state of a part image associated with each function in accordance with a compatibility between the function and a first element.

Modification 2

Modification 2 is described below. Modification 2 is a modification of the first exemplary embodiment. In Modification 2, the notification controller 24 changes contents of image processing performed on an image associated with an element in accordance with a user's use frequency of the element. For example, in a case where the apparatus image 42 associated with the multifunction printer 26 is selected by a user as illustrated in FIG. 6, the notification controller 24 changes images of other elements (second elements) displayed on the screen 40 in accordance with use frequencies of the other elements. The use frequencies may be use frequencies of the user who selects the multifunction printer 26 or may be use frequencies of all users. For example, a use history of each user is managed, for example, in the relay device 14 or a server, and the notification controller 24 calculates, for each element, a use frequency of a user or use frequencies of all users by referring to information indicative of the use history. A use history of each user is obtained by managing login to the terminal device 10 and the apparatus 12 or account information of a user using the terminal device 10 and the apparatus 12.

This is described below by using a specific example. The notification controller 24 calculates a use frequency of the notebook PC 28, a use frequency of the automobile 30, a use frequency of the cash register 32, a use frequency of the video camera 36, a use frequency of the projector 38, a use frequency of the password setting software X, and a use frequency of the document file Y. For example, in a case where the use frequency of the notebook PC 28 is higher than the use frequency of the projector 38, the notification controller 24 changes the apparatus image 44 associated with the notebook PC 28 and the apparatus image 52 associated with the projector 38 so that the apparatus image 44 becomes more noticeable than the apparatus image 52. For example, the notification controller 24 causes the apparatus images 44 and 52 to be displayed on the screen 40 so that a degree of transparency of the apparatus image 52 associated with the projector 38 of a lower use frequency is higher than a degree of transparency of the apparatus image 44 associated with the notebook PC 28. This allows the user to easily recognize an element of a higher use frequency.

Furthermore, the notification controller 24 may apply weighting processing based on a weight coefficient corresponding to a use frequency to each priority registered in the cooperative function management table. For example, the notification controller 24 applies weighting processing to a priority associated with a cooperative function using an element of a higher use frequency by using a larger weight coefficient. This is described below by using a specific example. The notification controller 24 applies weighting processing to a priority associated with each cooperative function while making a weight coefficient for a cooperative function that is executable with the use of the multifunction printer 26 and the notebook PC 28 larger than a weight coefficient for a cooperative function that is executable with the use of the multifunction printer 26 and the projector 38. As a result, a priority of a cooperative function that is executable with the use of an element of a higher use frequency tends to be higher than a priority of a cooperative function that is executable with the use of an element of a lower use frequency. The notification controller 24 applies image processing based on the weighted priorities to images associated with elements. For example, the transparency level is changed by the weighting processing, and an image associated with each element is displayed in accordance with a degree of transparency corresponding to the changed transparency level.

In another example, the notification controller 24 may apply weighting processing to a priority associated with a cooperative function of a higher use frequency by using a larger weight coefficient. As a result, a priority of a cooperative function of a higher use frequency tends to be higher than a priority of a cooperative function of a lower use frequency.

Second Exemplary Embodiment

An information processing system according to a second exemplary embodiment of the present invention is described. The information processing system according to the second exemplary embodiment has a configuration identical to the configuration of the information processing system according to the first exemplary embodiment, and a terminal device 10 according to the second exemplary embodiment has a configuration identical to the configuration of the terminal device 10 according to the first exemplary embodiment.

In the second exemplary embodiment, in a case where first information associated with a first element is selected by a user, a notification controller 24 changes second information associated with a second element (i.e., a compliant element) defined as an element that executes a function in cooperation with the first element. For example, in a case where images associated with elements are displayed on a display of a UI unit 18 and a first image associated with a first element is selected from among the images by a user, the notification controller 24 changes a second image associated with a second element that is a compliant element in relation to the first element. For example, the notification controller 24 changes at least one of a display position and a display mode of the second image associated with the compliant element. The notification controller 24 may change at least one of a display position and a display mode of the second image associated with the compliant element in accordance with compatibility between the first element and the second element.

In the second exemplary embodiment, the notification controller 24 may be provided in a device (e.g., an apparatus 12, a relay device 14, or a server) other than the terminal device 10, and processing performed by the notification controller 24 may be performed by the device other than the terminal device 10.

The information processing system according to the second exemplary embodiment is described below by using a specific example.

Function management information according to the second exemplary embodiment is described in detail below with reference to FIG. 11. FIG. 11 illustrates an example of a cooperative function management table that is function management information according to the second exemplary embodiment.

In the cooperative function management table according to the second exemplary embodiment, an ID of a cooperative function, information indicative of a name of the cooperative function, information indicative of elements (an apparatus, software, or a target) used for the cooperative function, information indicative of a compatibility level, information indicative of a priority, and information indicative of image processing are associated with one another for example.

As in the first exemplary embodiment, a whole apparatus or a part of an apparatus may be used as an element. Furthermore, a specific function of software may be used as an element. The compatibility level is identical to the compatibility level according to the first exemplary embodiment, and the priority is identical to the priority according to the first exemplary embodiment. Furthermore, as in the first exemplary embodiment, weighting processing may be applied to a priority on the basis of a user's use history of a cooperative function or an element.

The image processing is image processing applied to a second image associated with a second element when a first element is selected. The image processing is, for example, processing for changing a display position of an image. Specifically, the image processing is processing for moving a second image closer to a display position of a first image or processing for moving the second image farther away from the display position of the first image. A distance between the first image and the second image is determined depending on a distance level. A value in a range from 1 to 3 is decided in advance as a distance level in accordance with a priority (i.e., a compatibility level). A higher distance level is decided for a lower priority (i.e., poorer compatibility). That is, a distance level "1" corresponds to a priority "first", a distance level "2" corresponds to a priority "second", and a distance level "3" corresponds to a priority "third". The distance level "1" indicates a shortest distance (closest approach), the distance level "2" indicates a middle distance, and the distance level "3" indicates a longest distance. A distance indicated by a distance level is a distance between a first image and a second image on a screen. A distance level may indicate a distance range. For example, a distance range indicated by the distance level "1" is a distance range between distances L1 and L2 (L2 is larger than L1), a distance range indicated by the distance level "2" is a distance range between distances L3 and L4 (L3 is larger than L2 and L4 is larger than L3), and distance range indicated by the distance level "3" is a distance range between distances L5 and L6 (L5 is larger than L4 and L6 is larger than L5). The distance levels are merely an example, and a larger number of levels may be set as distance levels or two levels "closer" and "farther" may be set. Furthermore, distances corresponding to distance levels may be changed, for example, by a user or an administrator, and contents of image processing may be changed, for example, by a user or an administrator.

Cooperative functions illustrated in FIG. 11 are identical to the cooperative functions illustrated in FIG. 4. Furthermore, elements used for the cooperative functions are identical to the elements illustrated in FIG. 4. Distance levels associated with cooperative functions are specifically described below.

A combination of a "multifunction printer A" and a "PC (B1)" that are apparatuses is associated with a cooperative function "scan transfer function" given an ID "1". A compatibility level between the multifunction printer A and the PC (B1) is "1", a corresponding priority is "first", and a corresponding distance level is "1". For example, in a case where an apparatus image associated with the multifunction printer A is selected by a user in a state where the apparatus image associated with the multifunction printer A and an apparatus image associated with the PC (B1) are displayed on the display, the notification controller 24 causes the apparatus image associated with the PC (B1) to be displayed within the range between the distances L1 and L2 from a display position of the apparatus image associated with the multifunction printer A. Note that the multifunction printer A corresponds to a first apparatus, and the PC (B1) corresponds to a second apparatus. Similarly, in a case where the apparatus image associated with the PC (B1) is selected by the user, the notification controller 24 causes the apparatus image associated with the multifunction printer A to be displayed within the range between the distances L1 and L2 from a display position of the apparatus image associated with the PC (B1). In this case, the PC (B1) corresponds to a first element, and the multifunction printer A corresponds to a second element.

A combination of the "multifunction printer A" and a "PC (B2)" that are apparatuses is associated with a cooperative function "print function" given an ID "2". A compatibility level between the multifunction printer A and the PC (B2) is "2", a corresponding priority is "second", and a corresponding distance level is "2". For example, in a case where an apparatus image associated with the multifunction printer A is selected by a user in a state where the apparatus image associated with the multifunction printer A and an apparatus image associated with the PC (B2) are displayed on the display, the notification controller 24 causes the apparatus image associated with the PC (B2) to be displayed within the range between the distances L3 and L4 from a display position of the apparatus image associated with the multifunction printer A. Note that the multifunction printer A corresponds to a first apparatus, and the PC (B2) corresponds to a second apparatus. Similarly, in a case where the apparatus image associated with the PC (B2) is selected by the user, the notification controller 24 causes the apparatus image associated with the multifunction printer A to be displayed within the range between the distances L3 and L4 from a display position of the apparatus image associated with the PC (B2). In this case, the PC (B2) corresponds to a first element, and the multifunction printer A corresponds to a second element.

A combination of a "projector C" and the "PC (B1)" that are apparatuses is associated with a cooperative function "projecting function" given an ID "3". A compatibility level between the projector C and the PC (B1) is "2", a corresponding priority is "second", and a corresponding distance level is "2".

A combination of a "door opening/closing sensor D" and a "lighting device E" that are apparatuses is associated with a cooperative function "lighting function" given an ID "4". A compatibility level between the door opening/closing sensor D and the lighting device E is "3", a corresponding priority is "third", and a corresponding distance level is "3". For example, in a case where an apparatus image associated with the door opening/closing sensor D is selected by a user in a state where the apparatus image associated with the door opening/closing sensor D and an apparatus image associated with the lighting device E are displayed on the display, the notification controller 24 causes the apparatus image associated with the lighting device E to be displayed within the range between the distances L5 and L6 from a display position of the apparatus image associated with the door opening/closing sensor D. Note that the door opening/closing sensor D corresponds to a first apparatus, and the lighting device E corresponds to a second apparatus. Similarly, in a case where the apparatus image associated with the lighting device E is selected by the user, the notification controller 24 causes the apparatus image associated with the door opening/closing sensor D to be displayed within the range between the distances L5 and L6 from a display position of the apparatus image associated with the lighting device E. In this case, the lighting device E corresponds to a first element, and the door opening/closing sensor D corresponds to a second element.

A combination of "document creation software F" and "password setting software G" that are software is associated with a cooperative function "password function" given an ID "5". A compatibility level between the document creation software F and the password setting software G is "1", a corresponding priority is "first", and a corresponding distance level is "1". For example, in a case where a software image associated with the document creation software F is selected by a user in a state where the software image associated with the document creation software F and a software image associated with the password setting software G are displayed on the display, the notification controller 24 causes the software image associated with the password setting software G to be displayed within the range between the distances L1 and L2 from a display position of the software image associated with the document creation software F. Note that the document creation software F corresponds to a first element, and the password setting software G corresponds to a second element. Similarly, in a case where the software image associated with the password setting software G is selected by the user, the notification controller 24 causes the software image associated with the document creation software F to be displayed within the range between the distances L1 and L2 from a display position of the software image associated with the password setting software G. In this case, the password setting software G corresponds to a first element, and the document creation software F corresponds to a second element.

A combination of "document creation software F" and "data transmission software H" that are software is associated with a cooperative function "document transmission function" given an ID "6". A compatibility level between the document creation software F and the data transmission software H is "2", a corresponding priority is "second", and a corresponding distance level is "2".

A combination of a "document file J" and an "accounting file K" that are targets is associated with a cooperative function "file adding function" given an ID "7". A compatibility level between the document file J and the accounting file K is "3", a corresponding priority is "third", and a corresponding distance level is "3". For example, in a case where a target image associated with the document file J is selected by a user in a state where the target image associated with the document file J and a target image associated with the accounting file K are displayed on the display, the notification controller 24 causes the target image associated with the accounting file K to be displayed within the range between the distances L5 and L6 from a display position of the target image associated with the document file J. Note that the document file J corresponds to a first element, and the accounting file K corresponds to a second element. Similarly, in a case where the target image associated with the accounting file K is selected by the user, the notification controller 24 causes the target image associated with the document file J to be displayed within the range between the distances L5 and L6 from a display position of the target image associated with the accounting file K. In this case, the accounting file K corresponds to a first element, and the document file J corresponds to a second element.

A combination of the "multifunction printer A" that is an apparatus and "character recognizing software L" that is software is associated with a cooperative function "character recognizing function" given an ID "8". A compatibility level between the multifunction printer A and the character recognizing software L is "2", a corresponding priority is "second", and a corresponding distance level is "2". For example, in a case where an apparatus image associated with the multifunction printer A is selected by a user in a state where the apparatus image associated with the multifunction printer A and a software image associated with the character recognizing software L are displayed on the display, the notification controller 24 causes the software image associated with the character recognizing software L to be displayed within the range between the distances L3 and L4 from a display position of the apparatus image associated with the multifunction printer A. Note that the multifunction printer A corresponds to a first element, and the character recognizing software L corresponds to a second element. Similarly, in a case where the software image associated with the character recognizing software L is selected by the user, the notification controller 24 causes the apparatus image associated with the multifunction printer A to be displayed within the range between the distances L3 and L4 from a display position of the software image associated with the character recognizing software L. In this case, the character recognizing software L corresponds to a first element, and the multifunction printer A corresponds to a second element.

A combination of the "multifunction printer A" that is an apparatus and the "document file J" that is a target is associated with a cooperative function "print function" given an ID "9". A compatibility level between the multifunction printer A and the document file J is "1", a corresponding priority is "first", and a corresponding distance level is "1". For example, in a case where an apparatus image associated with the multifunction printer A is selected by a user in a state where the apparatus image associated with the multifunction printer A and a target image associated with the document file J are displayed on the display, the notification controller 24 causes the target image associated with the document file J to be displayed within the range between the distances L1 and L2 from a display position of the apparatus image associated with the multifunction printer A. Note that the multifunction printer A corresponds to a first element, and the document file J corresponds to a second element. Similarly, in a case where the target image associated with the document file J is selected by the user, the notification controller 24 causes the apparatus image associated with the multifunction printer A to be displayed within the range between the distances L1 and L2 from a display position of the target image associated with the document file J. In this case, the document file J corresponds to a first element, and the multifunction printer A corresponds to a second element.

A combination of the "character recognizing software L" that is software and an "image file M" that is a target is associated with a cooperative function "character extraction function" given an ID "10". A compatibility level between the character recognizing software L and the image file M is "2", a corresponding priority is "second", and a corresponding distance level is "2". For example, in a case where a software image associated with the character recognizing software L is selected by a user in a state where the software image associated with the character recognizing software L and a target image associated with the image file M are displayed on the display, the notification controller 24 causes the target image associated with the image file M to be displayed within the range between the distances L3 and L4 from a display position of the software image associated with the character recognizing software L. Note that the character recognizing software L corresponds to a first element, and the image file M corresponds to a second element. Similarly, in a case where the target image associated with the image file M is selected by the user, the notification controller 24 causes the software image associated with the character recognizing software L to be displayed within the range between the distances L3 and L4 from a display position of the target image associated with the image file M. In this case, the image file M corresponds to a first element, and the character recognizing software L corresponds to a second element.

A combination of a "scanner N" that is an apparatus, the "character recognizing software L" that is software, "form creation software P" that is software, a "receipt" that is a target, and an "accounting file Q" that is a target is associated with a cooperative function "file adding function" given an ID "11". A compatibility level among the elements is "3", a corresponding priority is "third", and a corresponding distance level is "3". In a case where an image associated with one of the elements used for the file adding function is selected by a user, the notification controller 24 causes images associated with the other elements to be displayed within the range between the distances L5 and L6 from a display position of the one of the elements. In this case, the one of the elements corresponds to a first element, and the other elements correspond to second elements.

A combination of a "web browser R" that is software, a "shopping site S" that is a target, and "clothing T" that is a target (a shopping target) is associated with a cooperative function "shopping function" given an ID "12". A compatibility level among the elements is "2", a corresponding priority is "second", and a corresponding distance level is "2". In a case where an image associated with one of the elements used for the shopping function is selected by a user, the notification controller 24 causes images associated with the other elements to be displayed within the range between the distances L3 and L4 from a display position of the image associated with the one of the elements. In this case, the one of the elements corresponds to a first element, and the other elements correspond to second elements.

As described above, an image associated with a second element that has higher compatibility with a first element is displayed closer to an image associated with the first element.

The cooperative functions illustrated in FIG. 11 are merely an example, and cooperative functions other than the above cooperative functions may be registered in the cooperative function management table. As in the first exemplary embodiment, a cooperative function may be a function that is executable with the use of an IoT apparatus. Furthermore, a cooperative function may be used in a connected home. Furthermore, a cooperative function may be executed through application of IFTTT. Furthermore, API cooperation may be encompassed within a cooperative function according to the second exemplary embodiment. As in the first exemplary embodiment, a part of the apparatus 12 may be used as hardware. Furthermore, an assembled function allocated to each block such as RPA may be used as software.

Operation of the terminal device 10 according to the second exemplary embodiment is described in detail below.

Figure 12:
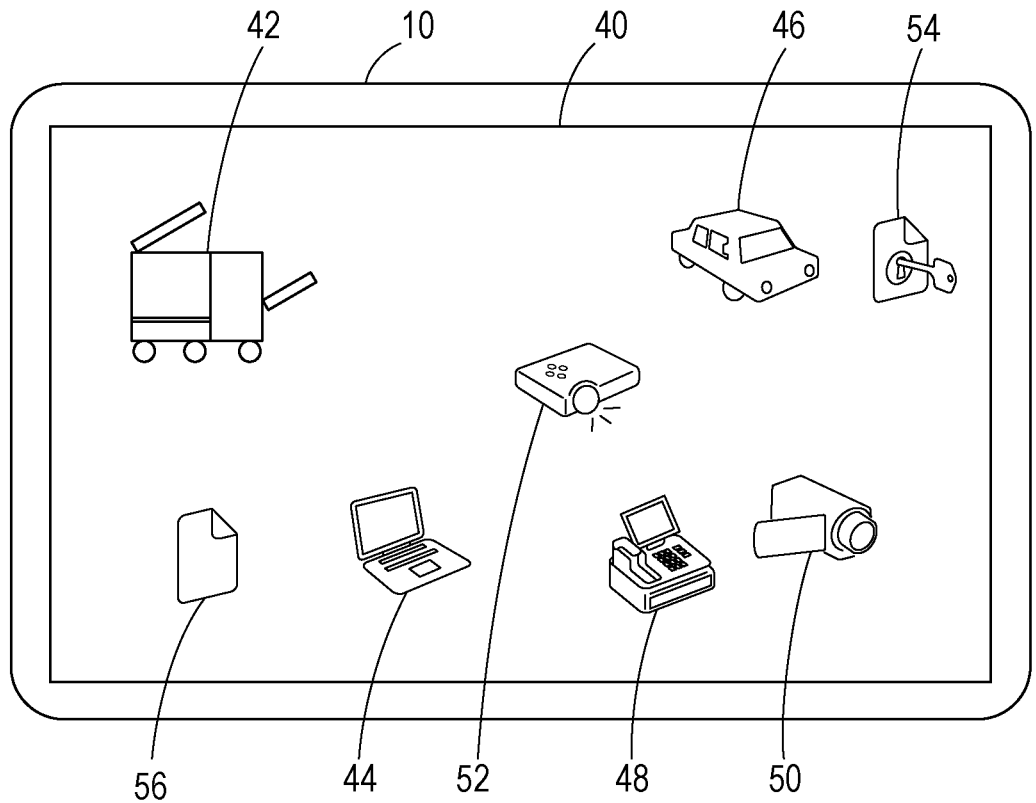
FIG. 12 illustrates a screen.

FIG. 12 illustrates a screen 40 displayed on the display of the UI unit 18. On the screen 40, an apparatus image, a software image, a target image, and the like are displayed. For example, an apparatus image 42 associated with a multifunction printer 26, an apparatus image 44 associated with a notebook PC 28, an apparatus image 46 associated with an automobile 30, an apparatus image 48 associated with a cash register 32, an apparatus image 50 associated with a video camera 36, an apparatus image 52 associated with a projector 38, a software image 54 associated with password setting software X, and a target image 56 associated with a document file Y are displayed on the screen 40.

In a case where a user selects the apparatus image 42 associated with the multifunction printer 26 by operating the UI unit 18 on the screen 40, the notification controller 24 specifies a compliant element (second element) that is registered in the cooperative function management table as an element that executes a cooperative function in cooperation with the multifunction printer 26 from among the elements displayed on the screen 40 while referring to the cooperative function management table. The notification controller 24 may specify a non-compliant element (second element) that is not registered in the cooperative function management table as an element that executes a cooperative function in cooperation with the multifunction printer 26 from among the elements displayed on the screen 40. Note that the multifunction printer 26 corresponds to a first element, and elements other than the multifunction printer 26 correspond to second elements.

For example, assume that the notebook PC 28, the cash register 32, the video camera 36, the projector 38, the password setting software X, and the document file Y are registered in the cooperative function management table as compliant elements in relation to the multifunction printer 26, and the automobile 30 is not registered in the cooperative function management table as a compliant element in relation to the multifunction printer 26. That is, the automobile 30 is a non-compliant element that is not registered in the cooperative function management table as an element that executes a cooperative function in cooperation with the multifunction printer 26.

Figure 13:
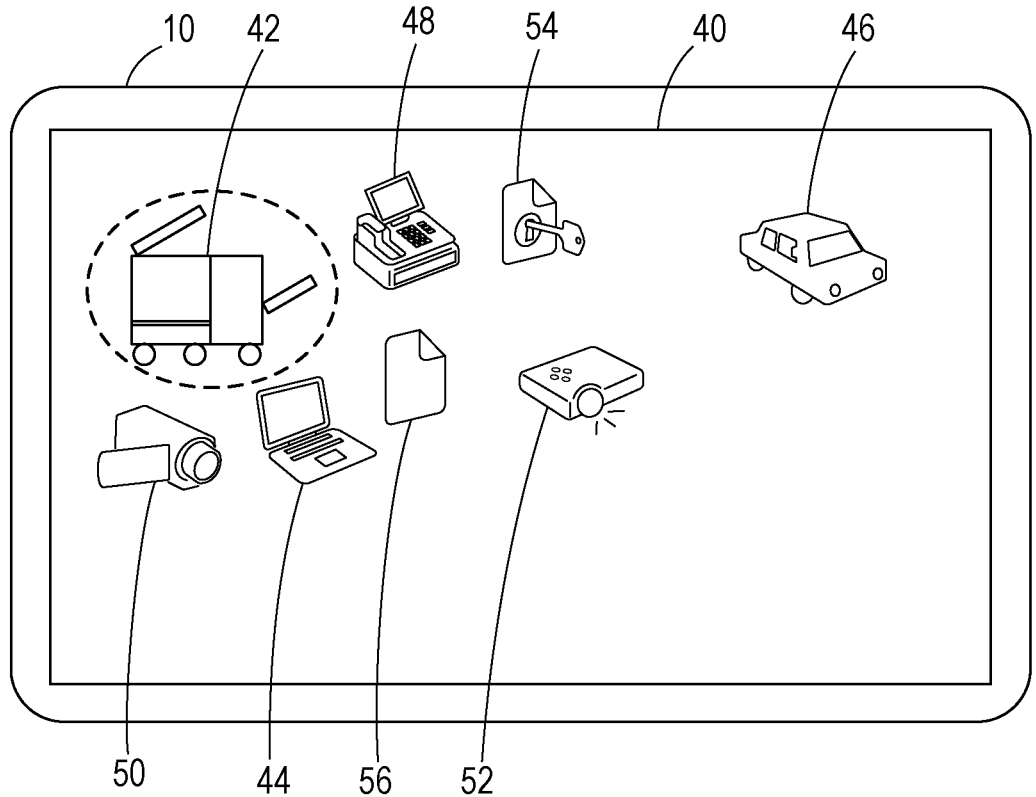
FIG. 13 illustrates a screen.

In this case, as illustrated in FIG. 13, the notification controller 24 brings images associated with the compliant elements (e.g., the apparatus image 44 associated with the notebook PC 28, the apparatus image 48 associated with the cash register 32, the apparatus image 50 associated with the video camera 36, the apparatus image 52 associated with the projector 38, the software image 54 associated with the password setting software X, and the target image 56 associated with the document file Y) closer to a display position of the apparatus image 42 associated with the multifunction printer 26. The notification controller 24 may bring an image associated with the non-compliant element (e.g., the apparatus image 46 associated with the automobile 30) farther away from the apparatus image 42 associated with the multifunction printer 26 or may keep a display position of the image associated with the non-compliant element.

As described above, an image associated with a compliant element is displayed closer to an image (e.g., the apparatus image 42) associated with an element (e.g., the multifunction printer 26) selected by a user. This allows the user to easily recognize the compliant element defined as an element that executes a cooperative function in cooperation with the selected element.

Although an apparatus image is selected by a user in the example illustrated in FIGS. 12 and 13, processing similar to the above processing is performed even in a case where a software image or a target image is selected by a user.

The notification controller 24 may display images associated with elements on the screen 40 by changing display positions of the images in accordance with compatibility between elements. For example, in a case where a compatibility level between the multifunction printer 26 and the automobile 30 is "3" and a corresponding distance level is "3", the notification controller 24 causes the apparatus image 46 associated with the automobile 30 to be displayed within the range between the distances L5 and L6 from a display position of the apparatus image 42 associated with the multifunction printer 26. In a case where a compatibility level between the multifunction printer 26 and the projector 38 is "2" and a corresponding distance level is "2", the notification controller 24 causes the apparatus image 52 associated with the projector 38 to be displayed within the range between the distances L3 and L4 from a display position of the apparatus image 42 associated with the multifunction printer 26. In a case where a compatibility level between each of the elements (the notebook PC 28, the cash register 32, the video camera 36, the password setting software X, and the document file Y) other than the automobile 30 and the projector 38 and the multifunction printer 26 is "1" and a corresponding distance level is "1", the notification controller 24 causes the apparatus image 44 associated with the notebook PC 28, the apparatus image 48 associated with the cash register 32, the apparatus image 50 associated with the video camera 36, the software image 54 associated with the password setting software X, and the target image 56 associated with the document file Y to be displayed within the range between the distances L1 and L2 from a display position of the apparatus image 42 associated with the multifunction printer 26. That is, an image associated with an element that has higher compatibility with the multifunction printer 26 is displayed closer to the apparatus image 42 associated with the multifunction printer 26. This allows a user to be visually notified of information concerning compatibility between elements in execution of a cooperative function.

As in the first exemplary embodiment, the notification controller 24 may change at least one of attributes including a degree of transparency, a display size, a mode of blinking, a vibration level, and a deformation amount of an image associated with each element in accordance with compatibility level between elements. The notification controller 24 may change a display position of an image in accordance with a compatibility level and further change at least one of the attributes or may change at least one of the attributes without changing a display position.

In a case where a screen is made up of plural pages, the notification controller 24 may move an image associated with a non-compliant element to a page that is not displayed or may move an image to a page that is not displayed in accordance with a distance level. This processing is described in detail below with reference to FIG. 14.

Figure 14:
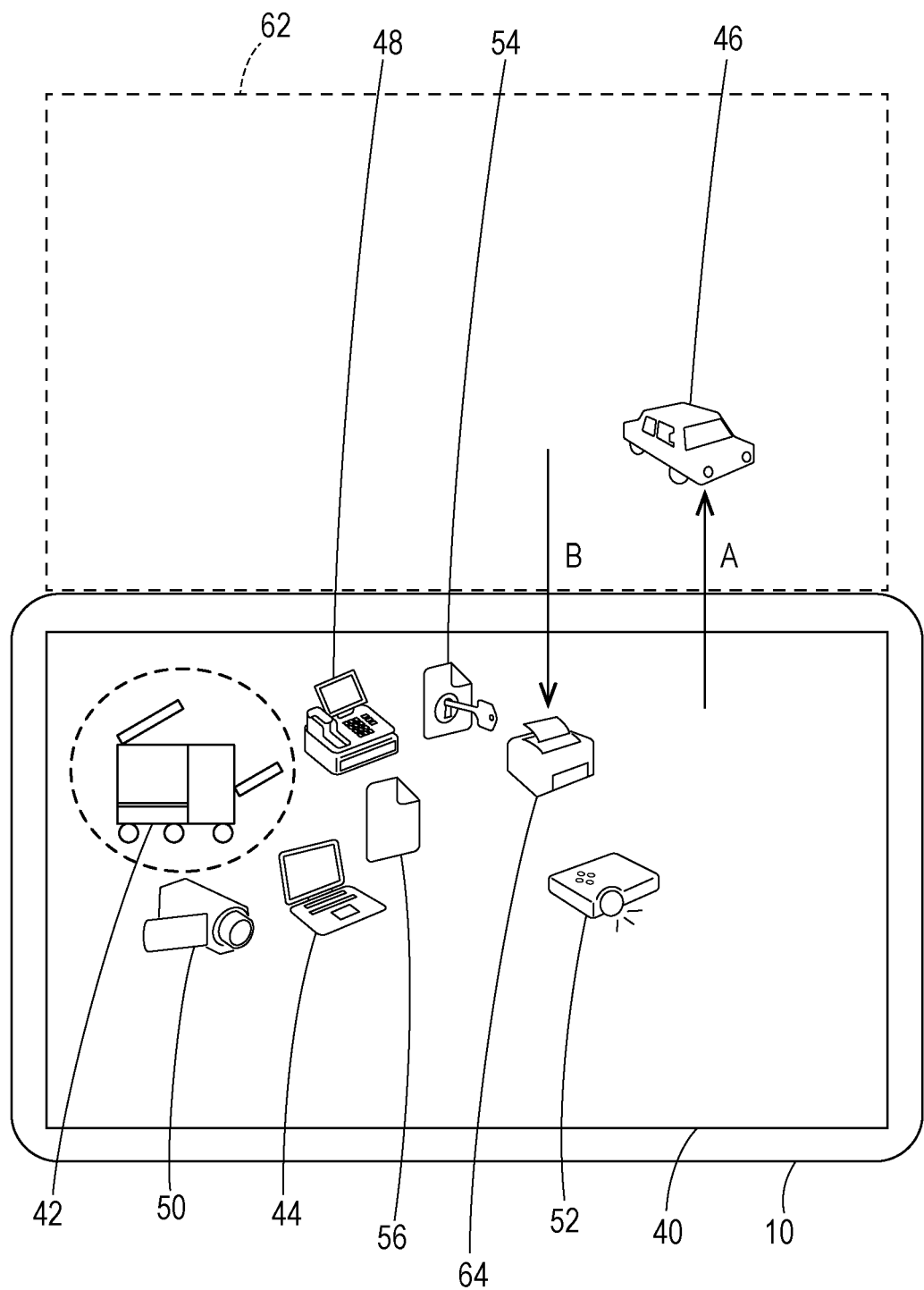
FIG. 14 illustrates a screen.

In FIG. 14, a page 62 indicated by the broken line is a page that is not displayed and is a page adjacent to a page that is being currently displayed. In a case where the automobile 30 is a non-compliant element in relation to the multifunction printer 26, the notification controller 24 may cause the apparatus image 46 associated with the automobile 30 to be displayed within the page 62 by moving the apparatus image 46 to the adjacent page 62 as indicated by arrow A. The notification controller 24 may cause the apparatus image 46 associated with the automobile 30 to be displayed within the adjacent page 62 in accordance with a distance level.

In a case where an image (e.g., an apparatus image 64 associated with a printer) associated with an element (e.g., the printer that is an apparatus) that is a compliant element in relation to the multifunction printer 26 is disposed within the adjacent page 62, the notification controller 24 may cause the apparatus image 64 to be displayed within the page that is being currently displayed by moving the apparatus image 64 to the page that is being currently displayed from the adjacent page 62 as indicated by arrow B.

Figure 15:
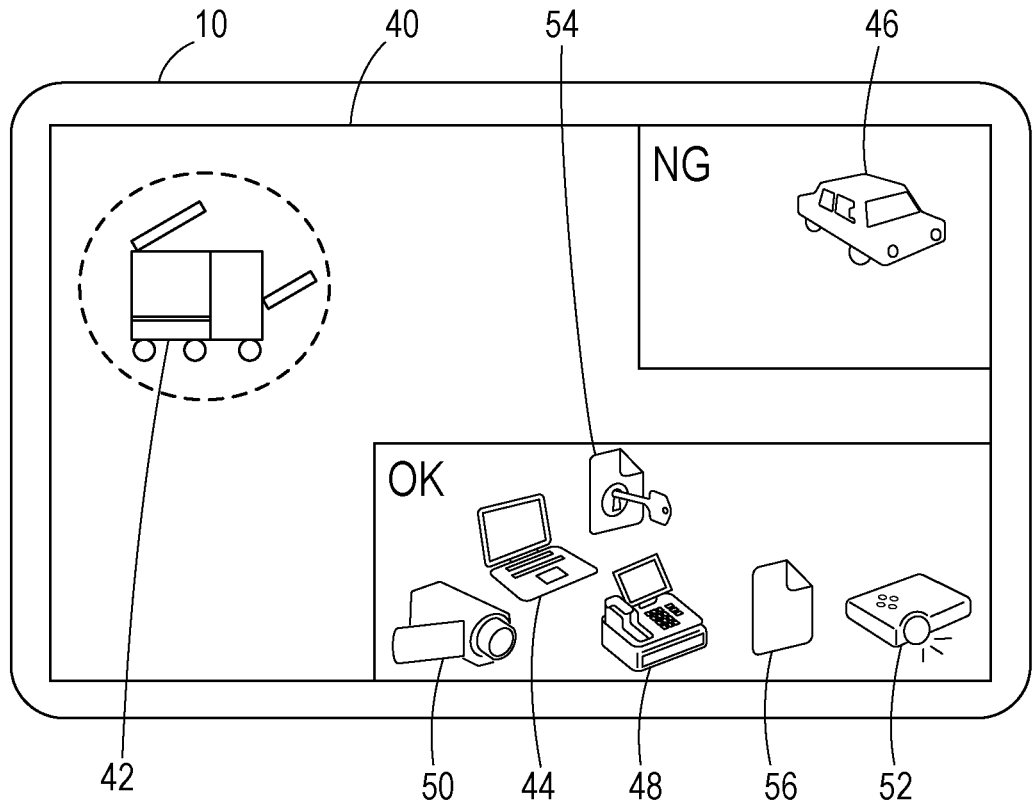
FIG. 15 illustrates a screen.

The notification controller 24 may cause an image associated with a compliant element and an image associated with a non-compliant element to be displayed in different display regions on the screen 40. For example, as illustrated in FIG. 15, the notification controller 24 forms a region for compliant element (a region indicated by OK) and a region for non-compliant element (a region indicated by NG) within the screen 40. The notification controller 24 causes an image associated with a compliant element to be displayed within the region for compliant element and causes an image associated with a non-compliant element to be displayed within the region for non-compliant element. For example, assume that the apparatus image 42 associated with the multifunction printer 26 is selected by a user. Since the automobile 30 is a non-compliant element in relation to the multifunction printer 26, the apparatus image 46 associated with the automobile 30 is displayed within the region for non-compliant element. Since elements other than the automobile 30 are compliant elements in relation to the multifunction printer 26, images associated with the elements other than the automobile 30 are displayed within the region for compliant element. This allows a user to easily recognize a compliant element defined as an element that executes a cooperative function in cooperation with a selected element.

Figure 16:
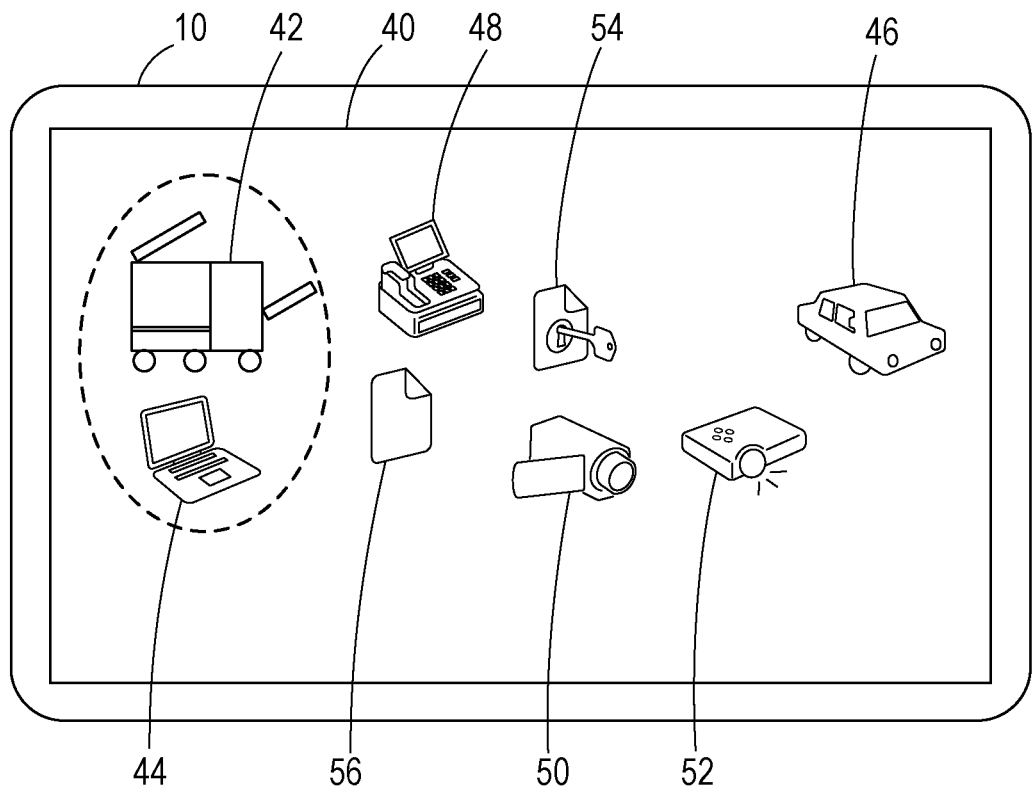
FIG. 16 illustrates a screen.

In a case where a compliant element (second element) is further selected by a user after a first image is selected by the user, the notification controller 24 specifies a compliant element (other second element) that is registered in the cooperative function management table as an element that executes a cooperative function in cooperation with the selected first element and compliant element from among elements displayed on the screen 40 while referring to the cooperative function management table. For example, in a case where the apparatus image 42 associated with the multifunction printer 26 is selected as an image associated with a first element and where the apparatus image 44 associated with the notebook PC 28 is further selected as an image associated with a compliant element as illustrated in FIG. 16, the notification controller 24 specifies a compliant element that is registered in the cooperative function management table as an element that executes a cooperative function in cooperation with the multifunction printer 26 and the notebook PC 28.

For example, assume that the cash register 32, the video camera 36, the password setting software X, and the document file Y are registered in the cooperative function management table as compliant elements in relation to the multifunction printer 26 and the notebook PC 28 and that the projector 38 and the automobile 30 are not registered in the cooperative function management table as compliant elements in relation to the multifunction printer 26 and the notebook PC 28. That is, the projector 38 and the automobile 30 are non-compliant elements.

In this case, the notification controller 24 brings the apparatus image 48 associated with the cash register 32, the apparatus image 50 associated with the video camera 36, the software image 54 associated with the password setting software X, and the target image 56 associated with the document file Y closer to the apparatus image 42 associated with the multifunction printer 26 and the apparatus image 44 associated with the notebook PC 28 and brings the apparatus image 52 associated with the projector 38 and the apparatus image 46 associated with the automobile 30 farther away from the apparatus images 42 and 44.

As described above, in a case where elements are sequentially selected by a user, a display position of an image associated with a compliant element and a display position of an image associated with a non-compliant element are sequentially changed. This allows the user to easily recognize compliant elements defined as elements that execute a cooperative function in cooperation with the multifunction printer 26 and the notebook PC 28.

Furthermore, the notification controller 24 may change a display position of an image associated with each element in accordance with compatibility with the multifunction printer 26 and the notebook PC 28.

For example, in a case where a compatibility level between a combination of the multifunction printer 26 and the notebook PC 28 and each of the cash register 32 and the document file Y is "1" and a corresponding distance level is "1", the notification controller 24 causes the apparatus image 48 associated with the cash register 32 and the target image 56 associated with the document file Y to be displayed within the range between the distances L1 and L2 from display positions of the apparatus images 42 and 44 (e.g., centers of the display positions of the apparatus images 42 and 44). In a case where a compatibility level between a combination of the multifunction printer 26 and the notebook PC 28 and each of the video camera 36 and the password setting software X is "2" and a corresponding distance level is "2", the notification controller 24 causes the apparatus image 50 associated with the video camera 36 and the software image 54 associated with the password setting software X to be displayed within the range between the distances L3 and L4 from display positions of the apparatus images 42 and 44. In a case where a compatibility level between the combination of the multifunction printer 26 and the notebook PC 28 and each of the automobile 30 and the projector 38 is "3" and a corresponding distance level is "3", the notification controller 24 causes the apparatus image 46 associated with the automobile 30 and the apparatus image 52 associated with the projector 38 to be displayed within the range between the distances L5 and L6 from display positions of the apparatus images 42 and 44.

In a case where selection of an image associated with an element is undone, the notification controller 24 returns a display state of an image associated with each element to a display state before the selection (an original display state). For example, in a case where a display position of an image associated with each element is changed in accordance with a compatibility level or in a case where a display position of an image associated with a compliant element is changed, the notification controller 24 returns the display positions of these images to original display positions. Furthermore, in a case where a degree of transparency, a display size, a mode of blinking, a vibration level, and a shape of an image associated with each element are changed in accordance with a compatibility level, the notification controller 24 returns these attributes to original states. For example, in a case where an image associated with a first element is selected by a user and then the selection of the image is undone (e.g., in a case where the selection is cancelled by the user), the notification controller 24 returns a display position of an image associated with a second element to an original display position. Furthermore, in a case where an image associated with a first element is selected by a user, an image associated with a second element is further selected by the user, and then the selection of the image associated with the second element is undone, the notification controller 24 returns a display position of an image associated with the other second element(s) to an original display position.

Processing performed in a case where selection of an image is undone is described in detail below. For example, as illustrated in FIG. 13, in a case where the apparatus image 42 associated with the multifunction printer 26 is selected by a user, the apparatus image 44 associated with the notebook PC 28, the apparatus image 48 associated with the cash register 32, the apparatus image 50 associated with the video camera 36, the apparatus image 52 associated with the projector 38, the software image 54 associated with the password setting software X, and the target image 56 associated with the document file Y are displayed closer to the apparatus image 42 associated with the multifunction printer 26. In a case where selection of the apparatus image 42 associated with the multifunction printer 26 is undone in this state, i.e., in a case where the selection of the apparatus image 42 is cancelled by the user, the notification controller 24 causes the images to be displayed at original display positions (display positions before the selection of the apparatus image 42) as illustrated in FIG. 12. This makes it possible to return a display state of an image to a state before selection of an image associated with an element by undoing selection of the image in a case where a situation such as erroneous selection of the image, erroneous operation, or retry of operation occurs.

Furthermore, in a case where selection of the apparatus image 44 associated with the notebook PC 28 is undone in a state where the apparatus image 42 associated with the multifunction printer 26 and the apparatus image 44 associated with the notebook PC 28 are being selected by a user as illustrated in FIG. 16, the notification controller 24 causes an image associated with each element to be displayed at a display position before the selection of the apparatus image 44 associated with the notebook PC 28 as illustrated in FIG. 13 since only the apparatus image 42 associated with the multifunction printer 26 is being selected.

In a case where selection of the apparatus image 42 associated with the multifunction printer 26 that is a first element is undone in a state where both of the apparatus images 42 and 44 are being selected as illustrated in FIG. 16, the notification controller 24 returns a display state of an image associated with an element that is a non-compliant element in relation to the multifunction printer 26 to an original state without returning a display state of an image associated with an element that is a compliant element in relation to the notebook PC 28 to an original display state. Furthermore, the notification controller 24 may change a display state of an image associated with each element in accordance with a compatibility level with the notebook PC 28.

Although selection of an image associated with an apparatus is undone in the above example, processing similar to the above processing is performed even in a case where selection of an image associated with software or a target (e.g., a file) is undone.

Modifications according to the second exemplary embodiment are described below.

Modification 3

Figure 17:
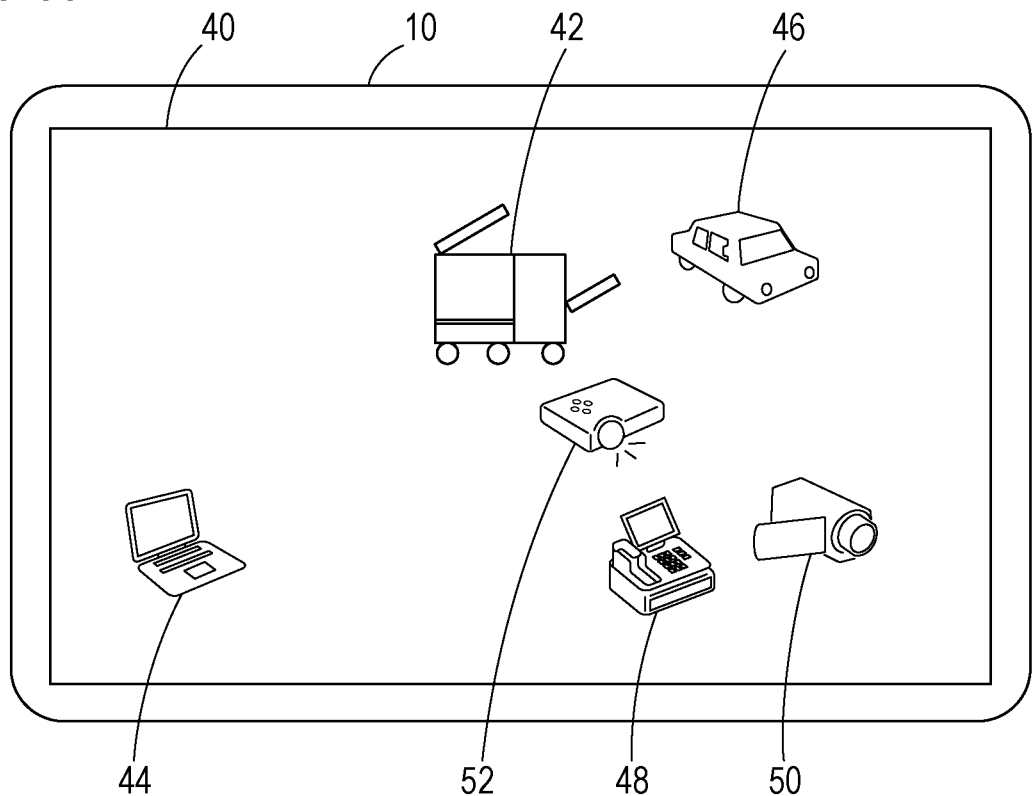
FIG. 17 illustrates a screen.
Figure 18:
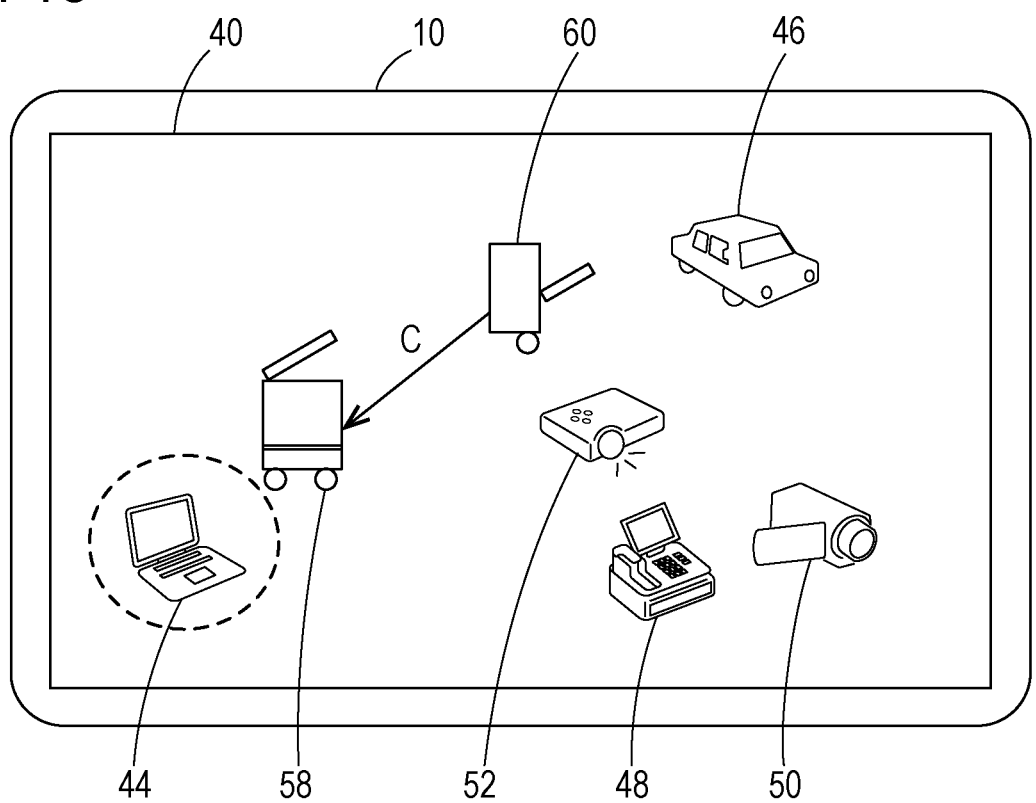
FIG. 18 illustrates a screen.

Modification 3 is described with reference to FIGS. 17 and 18. Modification 3 is a modification of the second exemplary embodiment. FIGS. 17 and 18 illustrate the screen 40. In Modification 3, in a case where a function is allocated to each part of an apparatus and a part of the apparatus is a compliant element, the notification controller 24 changes an image associated with the part. Modification 3 is described in detail below.

For example, as illustrated in FIG. 17, the apparatus image 42 associated with the multifunction printer 26, the apparatus image 44 associated with the notebook PC 28, the apparatus image 46 associated with the automobile 30, the apparatus image 48 associated with the cash register 32, the apparatus image 50 associated with the video camera 36, and the apparatus image 52 associated with the projector 38 are displayed on the screen 40.

In a case where a user selects the apparatus image 44 associated with the notebook PC 28 on the screen 40, the notification controller 24 specifies a compliant element (second element) that is registered in the cooperative function management table as an element that executes a cooperative function in cooperation with the notebook PC 28 from among the elements displayed on the screen 40 while referring to the cooperative function management table. For example, assume that a copy function, a scan function, and a print function are allocated to a body of the multifunction printer 26 and a post-processing function such as a stapling function is allocated to a post-processing part of the multifunction printer 26. In this case, assume that the body of the multifunction printer 26 is registered in the cooperative function management table as an element that executes a cooperative function in cooperation with the notebook PC 28, but the post-processing part of the multifunction printer 26 is not registered in the cooperative function management table as an element that executes a cooperative function in cooperation with the notebook PC 28. That is, the body of the multifunction printer 26 is a compliant element in relation to the notebook PC 28, and the post-processing part of the multifunction printer 26 is a non-compliant element in relation to the notebook PC 28. In this case, the notification controller 24 brings an apparatus image 58 (a part image) associated with the body of the multifunction printer 26 closer to the apparatus image 44 associated with the notebook PC 28 (see arrow C) as illustrated in FIG. 18. Meanwhile, the notification controller 24 does not change a display position of an apparatus image 60 (part image) associated with the post-processing part of the multifunction printer 26. This allows a user to easily recognize that the body of the multifunction printer 26 can execute a cooperative function in cooperation with the notebook PC 28. The same applies to other apparatuses, software, and targets.

Furthermore, the notification controller 24 may change a display position of an image (part image) associated with a part of an apparatus other than the notebook PC 28 in accordance with a compatibility level between the notebook PC 28 and the part. For example, in a case where a compatibility level between the notebook PC 28 and the body of the multifunction printer 26 is "1", the notification controller 24 causes the apparatus image 58 associated with the body of the multifunction printer 26 to be displayed between the distances L1 and L2 from the display position of the apparatus image 44 associated with the notebook PC 28. In a case where a compatibility level between the notebook PC 28 and the post-processing part of the multifunction printer 26 is "2", the notification controller 24 causes the apparatus image 60 associated with the post-processing part to be displayed between the distances L3 and L4 from the display position of the apparatus image 44 associated with the notebook PC 28. This allows a user to be visually notified of information concerning compatibility of each part in execution of a cooperative function. The same applies to other apparatuses, software, and targets.

The notification controller 24 may change at least one of attributes including a degree of transparency, a display size, a mode of blinking, a vibration level, and a deformation amount of an image associated with a part in accordance with a compatibility level. The notification controller 24 may change a display position of an image associated with a part in accordance with a compatibility level and further change at least one of the attributes or may change at least one of the attributes without changing a display position.

Modification 4

Modification 4 is described below. Modification 4 is a modification of the second exemplary embodiment. In Modification 4, the notification controller 24 changes a display position of an image associated with an element in accordance with a user's use frequency of the element. For example, in a case where a user selects the apparatus image 42 associated with the multifunction printer 26 as illustrated in FIG. 13, the notification controller 24 changes display positions of images associated with other elements (second elements) displayed on the screen 40 in accordance with use frequencies of the other elements. The use frequencies may be use frequencies of the user who selects the multifunction printer 26 or may be use frequencies of all users.

This is described below by using a specific example. The notification controller 24 calculates a use frequency of the notebook PC 28, a use frequency of the automobile 30, a use frequency of the cash register 32, a use frequency of the video camera 36, a use frequency of the projector 38, a use frequency of the password setting software X, and a use frequency of the document file Y. For example, in a case where the use frequency of the notebook PC 28 is higher than the use frequency of the projector 38, the notification controller 24 brings the apparatus image 44 associated with the notebook PC 28 closer to the apparatus image 42 associated with the multifunction printer 26 than the apparatus image 52 associated with the projector 38. That is, the apparatus image 44 is displayed closer to the apparatus image 42 than the apparatus image 52, and the apparatus image 52 is displayed farther away from the apparatus image 42 than the apparatus image 44. This allows a user to easily recognize an element of a higher use frequency.

Furthermore, the notification controller 24 may apply weighting processing based on a weight coefficient corresponding to a use frequency to each priority registered in the cooperative function management table. For example, the notification controller 24 applies weighting processing to a priority associated with a cooperative function using an element of a higher use frequency by using a larger weight coefficient. As a result, a priority of a cooperative function that is executable with the use of an element of a higher use frequency tends to be higher than a priority of a cooperative function that is executable with the use of an element of a lower use frequency. The notification controller 24 applies image processing based on a weighted priority to an image associated with each element. For example, a distance level is changed by the weighting processing, and an image associated with each element is displayed at a display position corresponding to the changed distance level.

In another example, the notification controller 24 may apply weighting processing to a priority associated with a cooperative function of a higher use frequency by using a larger weight coefficient. As a result, a priority of a cooperative function of a higher use frequency tends to be higher than a priority of a cooperative function of a lower use frequency.

Third Exemplary Embodiment

A third exemplary embodiment is described below. The third exemplary embodiment is a combination of the first and second exemplary embodiments. That is, the notification controller 24 may execute the processing according to the first exemplary embodiment and the processing according to the second exemplary embodiment. More specifically, the notification controller 24 may delete an image associated with a non-compliant element from a screen as the processing according to the first exemplary embodiment and may cause an image associated with a compliant element to be displayed closer to an image selected by a user as the processing according to the second exemplary embodiment. The notification controller 24 may change a display state (a degree of transparency, a display size, a mode of blinking, a vibration level, and a deformation amount) of both of the image associated with non-compliant element and the image associated with the compliant element in accordance with a compatibility level. The notification controller 24 may change a display state of an image (part image) associated with each part included in an element in accordance with a compatibility level.

Furthermore, in a case where an image associated with a first element is selected by a user, the notification controller 24 may change a color of an image associated with other element(s) whose compatibility level with the first element is equal to or higher than a threshold value to a color different from a color of an image associated with other element(s) whose compatibility level is lower than the threshold value. For example, the notification controller 24 may change a color of an image associated with other element(s) whose compatibility level is equal to or higher than the threshold value to a relatively noticeable color such as red.

In a case where an image associated with a first element is selected by a user, the notification controller 24 may change a color of an image associated with other element(s) in accordance with a compatibility level with the first element. For example, the notification controller 24 may change a color of an image associated with an element having a compatibility level "1" to red, change a color of an image associated with an element having a compatibility level "2" to blue, and change a color of an image associated with an element having a compatibility level "3" to yellow. This allows a user to be notified of a compatibility level of each element on the basis of a color. Needless to say, the notification controller 24 may change a color of an image to a color other than these colors.

Figure 19:
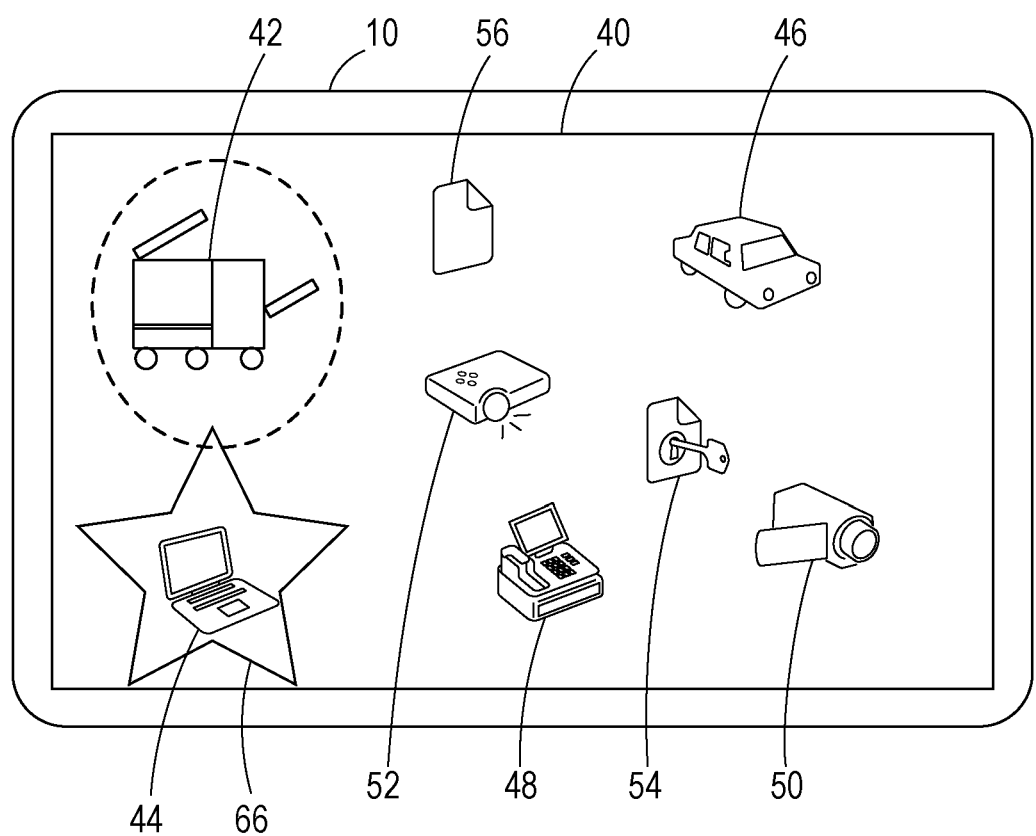
FIG. 19 illustrates a screen.

Furthermore, the notification controller 24 may cause an image associated with other element(s) whose compatibility level is equal to or higher than a threshold value to be surrounded by a figure having a specific shape. That is, the notification controller 24 causes a figure (e.g., a figure having a frame shape) having a shape surrounding the image associated with the element to be displayed on the display. For example, as illustrated in FIG. 19, the notification controller 24 causes an image (e.g., an apparatus image 44) associated with an element (e.g., a notebook PC 28) whose compatibility level between a first element (e.g., a multi-function printer 26) is equal to or higher than a threshold value to be surrounded by a frame-shaped FIG. 66 (e.g., a star-shaped figure) having plural pointed portions. That is, the apparatus image 44 is displayed within the FIG. 66. In another example, the notification controller 24 may cause an image associated with an element whose compatibility level is equal to or higher than a threshold value to be surrounded by a circle, an ellipse, a rectangle, or the like.

The notification controller 24 may change a shape of the figure in accordance with a compatibility level. For example, the notification controller 24 causes an image associated with an element having a compatibility level "1" to be surrounded by a star-shaped figure, causes an image associated with an element having a compatibility level "2" to be surrounded by a circular figure, and causes an image associated with an element having a compatibility level "3" to be surrounded by a rectangular figure. This allows a user to be notified of a compatibility level of each element on the basis of a shape of a figure.

The terminal device 10 is provided, for example, by cooperation of hardware and software. Specifically, the terminal device 10 includes one or more processors such as CPUs (not illustrated). The one or more processors read out and execute a program stored in a storage device (not illustrated), and thus functions of the units of the terminal device 10 are realized. The program is stored in the storage device via a recording medium such as a CD or a DVD or via a communication path such as a network. In another example, each unit of the terminal device 10 may be realized by a hardware resource such as a processor, an electronic circuit, or an application specific integrated circuit (ASIC). A device such as a memory may be used to realize each unit of the terminal device 10. In still another example, each unit of the terminal device 10 may be realized by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display that displays a first image of a first electronic apparatus, a second image of a second electronic apparatus, a third image of a third electronic apparatus, and a fourth image of a fourth electronic apparatus, the second electronic apparatus executing a function in cooperation with the first electronic apparatus, and the fourth electronic apparatus executing a function in cooperation with the third electronic apparatus; and
a controller programmed to:
control the display to change a display state of the second image upon selection of the first image via a user input interface, so as to move a display position of the second image closer to a display position of the first image, based on a degree of compatibility of the first electronic apparatus with respect to the second electronic apparatus, and control the display to change a display state of the fourth image upon selection of the third image via the user input interface, based on the degree of compatibility of the third electronic apparatus with respect to the fourth electronic apparatus, wherein the first, second, third, and fourth electronic apparatuses are separate apparatuses.

2. The information processing apparatus according to claim 1, wherein the controller causes the second image to be displayed within a specific display region on a display.

3. The information processing apparatus according to claim 1, wherein the controller causes the second image and other images of other electronic apparatuses that are not defined as electronic apparatuses that execute a function in cooperation with the first electronic apparatus to be displayed within different display regions.

4. An information processing apparatus comprising:

a display that displays a first image of a first electronic apparatus, a second image of a second electronic apparatus, a third image of a third electronic apparatus, and a fourth image of a fourth electronic apparatus, the second electronic apparatus executing a function in cooperation with the first electronic apparatus, and the fourth electronic apparatus executing a function in cooperation with the third electronic apparatus; and a controller programmed to:

control the display to change a display position of the second image upon selection of the first image via a user input interface, based on a degree of compatibility of the first electronic apparatus with respect to the second electronic apparatus, and control the display to change a display state of the fourth image upon selection of the third image via the user input interface, based on the degree of compatibility of the third electronic apparatus with respect to the fourth electronic apparatus, wherein the first, second, third, and fourth electronic apparatuses are separate apparatuses.

5. The information processing apparatus according to claim 4, wherein the controller brings the display position of the second image associated with the second electronic apparatus closer to a display position of the first image as the compatibility of the second electronic apparatus becomes higher.

6. The information processing apparatus according to claim 1, wherein the controller further changes the display state of the second image in accordance with a user's use frequency of the second electronic apparatus.

7. The information processing apparatus according to claim 1, wherein the controller returns the second image to an original state in a case where the selection of the first electronic apparatus is undone.

8. The information processing apparatus according to claim 1, wherein the controller changes, upon further selection of the second electronic apparatus, a display state of an image of another electronic apparatus based on the degree of compatibility of the another electronic apparatus with a combination of the selected first electronic apparatus and second electronic apparatus.

9. The information processing apparatus according to claim 8, wherein the controller returns the image to an original state in a case where the selection of the second electronic apparatus is undone.

10. A non-transitory computer readable medium storing a program causing a computer to execute a process comprising:

displaying, on a display, a first image of a first electronic apparatus, a second image of a second electronic apparatus, a third image of a third electronic apparatus, and a fourth image of a fourth electronic apparatus, the second electronic apparatus executing a function in cooperation with the first electronic apparatus, and the fourth electronic apparatus executing a function in cooperation with the third electronic apparatus;

changing a display state of the second image upon selection of the first image via a user input interface, so as to move a display position of the second image closer to a display position of the first image, based on a degree of compatibility of the first electronic apparatus with respect to the second electronic apparatus; and changing a display state of the fourth image upon selection of the third image via the user input interface, based on the degree of compatibility of the third electronic apparatus with respect to the fourth electronic apparatus, wherein the first, second, third, and fourth electronic apparatuses are separate apparatuses.

11. The information processing apparatus according to claim 1, wherein the controller is programmed to determine the degree of compatibility of the first electronic apparatus with respect to the second electronic apparatus by referencing a table that stores compatibility data for the first electronic apparatus and the second electronic apparatus.

12. The non-transitory computer readable medium according to claim 10, wherein the changing the display state of the second image comprises determining the degree of compatibility of the first electronic apparatus with respect to the second electronic apparatus by referencing a table that stores compatibility data for the first electronic apparatus and the second electronic apparatus.

13. The information processing apparatus according to claim 1, wherein the controller is programmed to determine the degree of compatibility of the first electronic apparatus with respect to the second electronic apparatus as one of three predetermined levels of compatibility, each of the three predetermined levels indicating a different degree of compatibility.

14. The non-transitory computer readable medium according to claim 10, wherein the changing the display state of the second image comprises determining the degree of compatibility of the first electronic apparatus with respect to the second electronic apparatus as one of three predetermined levels of compatibility, each of the three predetermined levels indicating a different degree of compatibility.

15. The information processing apparatus according to claim 1, wherein the controller is programmed to control the display to change the display state of the second image upon selection of the first image by changing a transparency level of the second image, based on the degree of compatibility of the first electronic apparatus with respect to the second electronic apparatus.

* * * * *